United States Patent
Lee

(10) Patent No.: US 7,426,405 B2
(45) Date of Patent: Sep. 16, 2008

(54) BATTERY PACK OF A MOBILE COMMUNICATION TERMINAL AND CONNECTOR FOR CONNECTING THE BATTERY PACK WITH THE TERMINAL

(75) Inventor: Min-Hwa Lee, Seoul (KR)

(73) Assignee: Healthpia America, Newark, NJ (US)

( * ) Notice: Subject to any disclaimer, the term of this patent is extended or adjusted under 35 U.S.C. 154(b) by 69 days.

(21) Appl. No.: 10/532,343

(22) PCT Filed: Oct. 20, 2003

(86) PCT No.: PCT/KR03/02194

§ 371 (c)(1),
(2), (4) Date: Apr. 22, 2005

(87) PCT Pub. No.: WO2004/038943

PCT Pub. Date: May 6, 2004

(65) Prior Publication Data

US 2006/0040171 A1    Feb. 23, 2006

(30) Foreign Application Priority Data

Oct. 24, 2002   (KR) .................. 10-2002-0065297
Dec. 5, 2002    (KR) .................. 10-2002-0077091
Mar. 12, 2003   (KR) .................. 10-2003-0015443

(51) Int. Cl.
*H04M 1/00* (2006.01)
(52) U.S. Cl. .............. 455/575.1; 455/90.2; 455/550.1; 455/572
(58) Field of Classification Search ... 455/575.1–575.9, 455/90.2, 550.1, 556.1, 572, 574, 127.1, 455/127.5, 343.5
See application file for complete search history.

(56) References Cited

U.S. PATENT DOCUMENTS

| | | | | |
|---|---|---|---|---|
| 5,535,434 | A * | 7/1996 | Siddoway et al. | 455/575.1 |
| 5,790,960 | A * | 8/1998 | Miyashita | 455/572 |
| 6,131,017 | A * | 10/2000 | Lebby et al. | 455/73 |
| 6,584,329 | B1 * | 6/2003 | Wendelrup et al. | 455/572 |
| 6,600,910 | B1 * | 7/2003 | Danet et al. | 455/292 |
| 6,809,649 | B1 * | 10/2004 | Wendelrup et al. | 340/636.1 |
| 2001/0021663 | A1 * | 9/2001 | Sawada et al. | 455/572 |
| 2002/0041175 | A1 | 4/2002 | Lauper et al. | |

(Continued)

FOREIGN PATENT DOCUMENTS

JP         09-270836    10/1997

(Continued)

*Primary Examiner*—Lester G. Kincaid
*Assistant Examiner*—Sayed T. Zewari
(74) *Attorney, Agent, or Firm*—Seyfarth Shaw, LLP

(57) ABSTRACT

A battery pack device with circuits for supporting additional functions such as a Karaoke function, a disease diagnosing function, and a skin beauty care function, and adapted to be detachably coupled to a mobile communication terminal, so as to perform the additional functions through the mobile communication terminal. The mobile communication terminal including the battery pack device is also disclosed. The battery pack device includes battery cells for supplying DC power to a body of the mobile communication terminal via power supply terminals, an additional circuit unit for providing additional functions to the terminal body, and a control unit for controlling an operation of the additional circuit unit while performing data transmission and reception with respect to an external device. The control unit includes an additional function processor for controlling the additional circuit unit, and a communication unit for performing data transmission and reception with respect to the terminal body.

15 Claims, 18 Drawing Sheets

FOREIGN PATENT DOCUMENTS

| | | |
|---|---|---|
| KR | 10-20010019664 | 3/2001 |
| KR | 20-0253140 | 10/2001 |
| KR | 20-0291392 | 9/2002 |
| KR | 10-20040020730 | 3/2004 |
| KR | 10-20040020731 | 3/2004 |
| KR | 10-20040020732 | 3/2004 |
| KR | 10-20040020740 | 3/2004 |

* cited by examiner

BATTERY PACK OF A MOBILE COMMUNICATION TERMINAL AND CONNECTOR FOR CONNECTING THE BATTERY PACK WITH THE TERMINAL

The present invention claims the benefit of Korean Patent Application No. 10-2002-0065297, filed in Korea on Oct. 24, 2002, Korean Patent Application No. 10-2002-0077091, filed in Korea on Dec. 2, 2002, Korean Patent Application No. 10-2003-0015443, filed in Korea on Mar. 12, 2003, and International Application No. PCT/KR2003/002194, filed on Oct. 20, 2003, which are all hereby incorporated by reference.

TECHNICAL FIELD

The present invention relates to a mobile communication terminal, and more particularly to a functional battery pack provided with circuits for supporting additional functions, for example, a Karaoke function, a disease diagnosing function, a skin beauty care function, etc., and adapted to be detachably coupled to a mobile communication terminal, so as to perform the additional functions through the mobile communication terminal. The present invention is applicable to a mobile phone, a personal digital assistant (PDA), and a portable terminal having an additional function such as an MP3 player function, which are configured such that a battery pack is detachably coupled thereto.

BACKGROUND ART

Incorporation of an additional optional circuit into a battery pack has been proposed in order to extend the function of a mobile communication terminal. Japanese Patent Laid-open Publication No. Heisei 9-270836 laid open on Oct. 14, 1997 discloses an additional device implemented by a radio circuit installed in a battery pack detachably coupled to a mobile communication terminal. Also, Korean Patent Laid-open Publication No. 2110-19664 laid open on Mar. 15, 2001 in the name of Taejin Kim discloses an audio player including an MP3 codec and a flash memory module incorporated into the battery pack of a mobile communication terminal, while being controlled by a user interface included in the mobile communication terminal.

In association with such techniques, the applicant has proposed a battery pack device capable of supporting various functions such as low frequency therapy, ultrasonic beauty care, and body impedance measurement in a state of being coupled to a mobile communication terminal. Such a battery pack device is disclosed in Korean Patent Application Nos. 2002-53004, 2002-52994, 2002-52995, and 2002-52996 filed on Sep. 3, 2002. Such a battery pack device is configured by incorporating desired probes and associated driving circuits into a battery pack. The battery pack device can also communicate with a mobile communication terminal in a state of being coupled to the mobile communication terminal. The battery pack device can support the above mentioned functions in accordance with operations of the circuits thereof controlled by an application program executed in the mobile communication terminal.

FIG. 1 schematically illustrates the configuration of a beauty care apparatus disclosed in Korean Patent Application No. 2002-53004 as an embodiment relating to a mobile phone having ultrasonic and low frequency therapy functions.

This beauty care apparatus includes probes for ultrasonic/low frequency therapy installed on the outer surface of a battery pack. The user may select an ultrasonic therapy function from a function menu displayed on a mobile communication terminal, to which the battery pack is coupled. After selecting a desired level of the ultrasonic therapy function, the user may enter a start command. When the user subsequently brings the ultrasonic probes electrodes into contact with the skin, for example, the skin of the face, the beauty care apparatus detects this contact, thereby supplying ultrasonic waves to ultrasonic probes 130 and 140. The beauty care apparatus also includes first and second control units 100 and 150 adapted to perform data transmission and reception therebetween via a communication interface 30. The first control unit 100 drives an ultrasonic driver 120 and a low frequency driver 110 in accordance with a command from the second control unit 150.

Such a multi-functional integrated battery pack device must communicate with the body of the mobile communication terminal. Also, the terminal body should include an application program adapted to be executed, for example, under a virtual machine-based environment, so as to control the user interface of the terminal body. The application program must perform data transmission and reception with respect to the battery pack device. For instance, the terminal body should transmit a control command to the battery pack device, and receive data obtained in accordance with the control command.

For the provision of the above mentioned probes, however, it is necessary to modify the mold for manufacturing the body of the mobile communication terminal. As a result, a considerable increase in the manufacturing cost of the mobile communication terminal. Furthermore, taking into consideration the fact that currently available mobile communication terminals have a compact structure, addition of such elements having a relatively large size causes a considerable increase in the size of the mobile communication terminal, to which the elements are added.

Furthermore, various problems may occur when the above mentioned multi-functional integrated battery pack device is practically implemented. This will be described hereinafter. Most mobile communication terminals support a power supply management function in order to extend the life of a battery while protecting the battery. This function includes a power saving function for controlling the voltage level of electric power or the interval of clocks supplied to the main control unit and peripheral units of a terminal in accordance with the operating condition of the terminal, in order to control the consumption of the electric power. However, such a power saving function cannot be supported for an integrated battery pack device, so that the integrated battery pack device has a problem associated with management of electric power. That is, circuits installed in such a battery pack device excessively consume electric power because they are always in an active state so that they perform their intrinsic additional functions when those functions are required.

Meanwhile, a smart card, in which an IC including a microprocessor, an operating system, a security module, and a memory is installed, for storage, computation, and security functions, is widely used as means for recording of information, identification of personal character, and payment in most social fields including communication, banking, education, administration, and traffic fields.

In an application thereof to a mobile communication terminal, a representative example of such a smart card is a subscriber identity module for providing a roaming service. For a smart card usable as such a subscriber identity module, there are subscriber identity module (SIM), universal subscriber identity module (USIM), user identity module (UIM), and removable user identity module (RUIM) cards. In a GSM (Global System for Mobile Communications) system, which is a mobile communication system adopted in Europe, the SIM card is applied as a subscriber identity module which may be an interface between a mobile phone and a network, in order to cope with replacement of a terminal or replacement of a communication service provider. Such an SIM card stores therein user's information including a user's phone number. Accordingly, once a mobile phone, to which such an SIM card is mounted, is turned on, it can transmit information stored in the SIM card to a communication service provider via a network. After a use approval by the communication service provider, the user can normally use the mobile phone. The USIM card is a smart card making a mobile phone or computer to be applicable to a universal mobile telecommunications system (UMTS) capable of allowing the user of the mobile phone or computer to transmit texts based on broadband packets, digitalized audio and video, and multimedia data at a bit rate of 2 Mbps or more, in any place in the world. Such a USIM card is installed in a terminal commercially available for international mobile communications (IMT)-2000 services. This USIM card can store therein user data along with secret authentication data. The UIM card is a smart card developed to improve the SIM card of the Europe GSM so as to make the SIM be applicable to a second-generation code division multiple access (CDMA) system. The RUIM card is a detachable smart card developed to make the SIM be applicable to a third-generation CDMA system.

Another application example of a smart card to a mobile communication terminal is the case in which the smart card is used as diverse payment means such as electronic cash (for example, a traffic card) and a credit card. In such a case, 13 connecting terminals of the smart card are electrically connected to the mobile communication terminal, and 2 connecting terminals of the smart card are connected to a radio frequency (RF) antenna installed in the mobile communication terminal, so that the smart card can be used, for example, to pay a charge such as a traffic fare on time, based on charge payment information transmitted between the smart card and an external interface (card reader) in accordance with a communication function of the mobile communication terminal.

Meanwhile, various techniques for mounting a smart card to a mobile communication terminal have been known prior to the filing of the present invention (FIGS. 18 to 22). Referring to FIG. 18, a connector is used for an electrical connection between terminals 1831 provided at the lower surface of a smart card 1830 and terminals 1841 provided at a printed circuit board 1840 mounted to the body of a mobile communication terminal. This connector includes a housing 1810 having an outer structure of a certain shape, and a plurality of terminals 1820 each electrically connected, at one end thereof, to an associated one of the terminals 1831 provided at the lower surface of the smart card 1830, while being electrically connected, at the other end thereof, to an associated one of the terminals 1841 provided at the printed circuit board 1840 of the mobile communication terminal.

FIGS. 19 to 22 illustrate techniques for guiding and detachably mounting a smart card to a seat provided at the rear surface of a mobile communication terminal, respectively. Referring to FIG. 19, a recessed seat 1911 is provided at a rear surface 1910 of a mobile communication terminal. The recessed seat 1911 has a certain depth so that it receives a smart card 1920. The recessed seat 1911 guides the smart card 1920 to receive the smart card 1920. The smart card 1920 is firmly held in a state of being received in the recessed seat 1911 by means of a thin metal plate 1930. Separation preventing protrusions 2038 may also be provided at the rear surface of the mobile communication terminal, so as to assist the thin metal plate 2070 to be held in the recessed seat 1911, as shown in FIG. 20.

Referring to FIG. 21, terminals 2131 made of an elastic material are mounted to a bottom surface 2112 of the connector housing such that they are upwardly protruded. The terminals 2131 serve to apply an upward force to a smart card in a state in which the smart card is mounted on the bottom surface 2112 of the connector housing. Card guiders 2121 are provided at opposite sides of the connector housing while being upwardly spaced apart from the bottom surface 2112 of the connector housing. The card guiders 2121 serve to prevent the smart card from being upwardly separated from the connector housing. Thus, the smart card is firmly mounted on the bottom surface 2112 of the connector housing. Of course, the smart card is guided to be mounted on the bottom surface 2112 of the connector housing by opposite lateral walls 2114 of the connector housing.

FIG. 22 illustrates a technique in which a guide unit is provided at a connector housing 2220 while including a mounting member for detachably mounting a smart card by covering at least a part of the upper surface of the smart card. That is, guide rails 2240 and card holding members 2250 are formed at the connector housing 2200 such that they are integral with the connector housing 2200, as shown in FIG. 22.

In accordance with the present invention, a connector is implemented which serves to connect a circuit installed in a battery pack to a mobile communication terminal to which a smart card is mounted. Where an interface structure separate from the smart card mounting structure shown in any one of FIGS. 18 to 22 is used to connect the circuit of the battery pack to the body of the mobile communication terminal, there are problems of an increase in the manufacturing cost of the mobile communication terminal and an increase in the size of the mobile communication terminal. Furthermore, the mobile communication terminal maker encounters a problem in that a separate manufacturing line should be installed in order to manufacture mobile communication terminals adapted to use the above mentioned circuit-installed battery pack.

Therefore, in the case of implementing a connector for the circuit installed in the battery pack, it is most important to make the circuit installed in the battery pack be connected to the body of the mobile communication terminal without any considerable modification of the existing smart card mounting structure.

In accordance with the known smart card mounting techniques, once the smart card is mounted to the mobile communication terminal, the terminals provided at the lower surface of the smart card are electrically connected with the terminals provided at the body of the mobile communication terminal, so that the smart card is connected with a microprocessor installed in the terminal body for communications therebetween. In other words, the conventional techniques are limited only to smart card mounting. Therefore, it is necessary to provide a concrete scheme for connecting the terminals of the circuit, arranged at the surface of the battery pack to come into contact with the terminal body, to the terminal body.

DISCLOSURE OF THE INVENTION

The present invention has been made in view of the above mentioned problems, and an object of the invention is to provide a mobile communication terminal configured to allow a battery pack including circuits for supporting additional functions to be detachably coupled thereto, while minimizing a mold modification thereof and an increase in an addition of elements.

Another object of the invention is to provide a multi-functional integrated battery pack device having an additional function for efficiently managing the consumption of electric power thereof.

Another object of the invention is to provide a communication connector for connecting a circuit internally installed in a battery pack to the body of a mobile communication terminal.

Another object of the invention is to connect a circuit internally installed in a battery pack to the body of a mobile communication terminal without any considerable modification of an existing smart card mounting structure.

In accordance with one aspect, the present invention provides a battery pack device for a mobile communication terminal comprising: at least one battery cell for supplying a DC power to a body of the mobile communication terminal via power supply terminals; an additional circuit unit for providing additional functions to the terminal body; and a control unit for controlling an operation of the additional circuit unit while performing data transmission and reception with respect to an external device, the control unit including an additional function processor for controlling the additional circuit unit, and a communication unit for performing data transmission and reception with respect to the terminal body, the communication unit including a communication controller for transforming data obtained in accordance with a data processing operation of the additional function processing unit into data having a predetermined transmission format, while supplying data, externally received thereto, to the additional function processor as an operating command, a modulator/demodulator for performing a modulation/demodulation for data to be sent to the communication controller or received from the communication controller, and a transmitter/receiver for receiving modulated data received from the modulator/demodulator while transmitting data, to be demodulated, to the modulator/demodulator.

In accordance with this aspect, the battery pack device has an advantage in that the transmitter/receiver, which is externally exposed, may be freely-modified by addition of a simple modulating/demodulating circuit, because the battery pack device communicates with the mobile communication terminal in a state of being approximate to the mobile communication terminal without being directly connected with the mobile communication terminal.

In accordance with another aspect of the present invention, the transmitter/receiver includes a choke filter connected between the battery cell and the power supply terminals, and a capacitance element connected, at one end thereof, to a line branching from a line between the choke filter and the power supply terminals, and adapted to cut off DC components.

In accordance with this aspect, the battery pack device has an advantage in that it can communicate with the terminal body only by addition of a very simple analog element thereto and addition of a modulator/demodulator of a relatively very low level, without any separate terminal for data transmission and reception.

In accordance with another aspect of the present invention, the transmitter/receiver is a coil arranged in the form of a plate extending along a coupling surface of the battery pack device to be coupled with a facing coupling surface of the terminal body so that it faces a coil arranged at the coupling surface of the terminal body in a state in which the battery pack device is coupled to the terminal body, thereby forming a transformer.

In the battery pack device according to this aspect of the present invention, for data transmission and reception, the coil thereof is attached to the surface of the battery pack device facing the terminal body such that it is arranged in the form of a plate extending along the surface of the battery pack device. In accordance with an inductive coupling of the coil to the coil of the terminal body, data communication can be achieved between the battery pack device and the terminal body. Accordingly, there is an advantage in that the battery pack device can communicate with the terminal body simply by addition of a very simple analog element thereto and addition of a modulator/demodulator of a very low level, without any modification of the mold for fabricating the battery pack device. Since the coils forming a transformer are arranged to be closely approximate to each other, the modulators/demodulators of the battery pack device and terminal body can adopt an FM system of a relatively low frequency.

In accordance with another aspect of the present invention, the modulator/demodulator is a Bluetooth RF transmitting/receiving module.

In the battery pack device according to this aspect of the present invention, there are advantages in that it is possible to minimize provision of additional circuits, and it is unnecessary to modify the mold used to fabricate the terminal body, because the battery pack device is connected to a multipoint communication means used in the existing mobile communication terminal.

In accordance with another aspect of the present invention, the transmitter/receiver is an infrared transmitter/receiver installed at an opening formed at a coupling surface of the battery pack to be coupled with a facing coupling surface of the terminal body.

In the battery pack device according to this aspect of the present invention, there are advantages in that it is possible to minimize provision of additional circuits, and it is unnecessary to modify the mold used to fabricate the terminal body.

In accordance with another aspect of the present invention, the transmitter/receiver includes connecting pins protruded from the battery pack device, and adapted to elastically come into electrical contact with an electrode plate installed at the terminal body.

In accordance with another aspect of the present invention, the battery pack device further comprises a detecting unit for detecting the amount of electric power supplied to the power supply terminals. The control unit further includes a power controller for controlling respective power consumption levels of circuits internally provided at the battery pack device in accordance with the amount of electric power detected by the detecting unit.

In the battery pack device, which is detachably coupled to the terminal body while including circuits for providing additional functions, the power consumption of the additional function providing circuits can be managed, based on the power management mode of the terminal body, in accordance with this aspect of the present invention. Accordingly, it is possible to efficiently manage the consumption of electric power in accordance with the operating mode of the terminal body selected by the user.

Furthermore, even when it is difficult to inform the battery pack device of the power management mode of the terminal body, it is possible to efficiently manage the power consumption of the battery pack device by detecting the electric power supplied from the battery pack device to the terminal body.

In accordance with another aspect of the present invention, the battery pack device further comprises a power controller for controlling respective power consumption levels of circuits internally provided at the battery pack device in accordance with a power management mode command from the terminal body received via the communication unit.

In accordance with this aspect of the present invention, the terminal body informs the battery pack device of the current power management mode at the request of the battery pack device. Based on the current power management mode, the battery pack device can control its power management mode. Accordingly, it is possible to efficiently manage the power consumption of the battery pack device without addition of any separate additional circuit for power management.

In accordance with another aspect, the present invention provides, in a mobile communication terminal including a smart card slot, a communication connector for connecting a circuit internally provided at a battery pack to a body of the mobile communication terminal, the communication connector comprising: a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; and a second connector section including a clip member for receiving the smart card such that it is in close contact with at least a part of the lower surface of the smart card and at least a part of an upper surface of the smart card while covering the upper and lower surface parts, an upper connecting member provided at an upper surface of the clip member while having a plurality of terminals each electrically connected with an associated one of terminals extending from the circuit internally provided at the battery pack to a lower surface of the battery pack, a lower connecting member provided at a lower surface of the clip member while having a plurality of terminals each electrically connected with an associated one of terminals provided at the lower surface of the smart card, and an intermediate connecting member adapted to electrically connect associated terminals of the upper and lower connecting members.

In accordance with this aspect of the present invention, it is possible to electrically connect the terminals of the battery pack circuit to associated terminals of the PCB included in the mobile communication terminal by use of upper and lower connecting members included in the clip member, without any modification of the existing smart card mounting structure adapted to mount the smart card while electrically connecting terminals provided at the lower surface of the smart card to associated communication terminals of the microprocessor included in the mobile communication terminal, by inserting the smart card in the clip member, for example, forcibly fitting the smart card in the clip member.

In accordance with another aspect of the present invention, the PCB of the mobile communication terminal outputs includes a microprocessor for outputting a first enable signal to the smart card while outputting a second enable signal to the battery pack circuit.

In response to an enable signal from the microprocessor included in the mobile communication terminal body, only an associated one of the smart card and battery pack circuit operates. Accordingly, although the terminals provided at the smart card and the terminals of the battery pack circuit are electrically connected to the same terminals of the mobile communication terminal body, it is possible to prevent collision of data, being transmitted, in a software manner.

In accordance with another aspect, the present invention provides, in a mobile communication terminal including a smart card slot, a communication connector for connecting a circuit internally provided at a battery pack to a body of the mobile communication terminal, the communication connector comprising: a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; a guide member adapted to guide and detachably mount the smart card while having holders adapted to cover at least a part of an upper surface of the smart card, thereby holding the smart card; and a second connector section including an upper connecting member having a plurality of terminals provided at respective upper surfaces of the holders, and electrically connected with terminals extending from a circuit internally provided at the battery pack to a lower surface of the battery pack, a lower connecting member having a plurality of terminals each electrically connected with one of one end or the other end of an associated one of the terminals included in the first connector section or an associated one of the terminals provided at the PCB, and an intermediate connecting member adapted to electrically connect associated terminals of the upper and lower connecting members.

In accordance with this aspect of the present invention, it is possible to electrically connect the terminals of the battery pack circuit to associated terminals of the PCB included in the mobile communication terminal by electrically connecting the terminals of the battery pack circuit to respective upper surfaces of holders included, to cover at least a part of the upper surface of the smart card, in the existing smart card mounting structure adapted to mount the smart card while electrically connecting terminals provided at the lower surface of the smart card to associated communication terminals of the microprocessor included in the mobile communication terminal, while using the existing connection configuration for the terminals of the PCB.

In accordance with another aspect, the present invention provides, in a mobile communication terminal including a smart card slot, a communication connector for connecting a circuit internally provided at a battery pack to a body of the mobile communication terminal, the communication connector comprising: a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; and a second connector section including a clip member for receiving the smart card such that it is in close contact with at least a part of the lower surface of the smart card and at least a part of an upper surface of the smart card while covering the upper and lower surface part, an upper connecting member provided at an upper surface of the clip member while having a plurality of terminals each electrically connected with an associated one of terminals extending from a circuit (not shown) internally provided at the battery pack to a lower surface of the battery pack, a lower connecting member provided at a lower surface of the clip member while having a plurality of terminals each electrically connected with an associated one of battery pack circuit communication terminals provided at the PCB, and an intermediate connecting member adapted to electrically connect associated terminals of the upper and lower connecting members.

In accordance with this aspect of the present invention, it is possible to electrically connect the terminals of the battery pack circuit to respective terminals separately provided at the PCB included in the mobile communication terminal by use of the upper and lower connecting members included in the clip member, without any modification of the existing smart card mounting structure adapted to mount the smart card while electrically connecting terminals provided at the lower surface of the smart card to the associated communication terminals of the microprocessor included in the mobile communication terminal, by inserting the smart card in the clip member, for example, forcibly fitting the smart card in the clip member. In this case, the housing of the mobile communication terminal body may be designed in such a manner that the space defined therein to receive the smart card is increased by the thickness of the clip member. Where the housing of the mobile communication terminal body has an elasticity, it is usable as it is, without any modification of the space thereof for receiving the smart card. Also, it is only required that the hole formed at the housing to externally expose a required connector section, for example, the first connector section in the conventional connector, has a width increased to provide a space for electrical connection between the lower connecting members of the clip member and the terminals of the PCB.

In association with the PCB, there is only a requirement for the PCB to be additionally provided with terminals for communication with the battery pack circuit. In order to minimize an increase in the size of the PCB while achieving a firm electrical connection, male and female board-to-board connectors may be used which are conventionally used in designing a mobile communication terminal circuit.

In accordance with another aspect, the present invention provides, in a mobile communication terminal including a smart card slot, a communication connector for connecting a circuit internally provided at a battery pack to a body of the mobile communication terminal, the communication connector comprising: a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; a guide member adapted to guide and detachably mount the smart card while having holders adapted to cover at least a part of an upper surface of the smart card, thereby holding the smart card; and a second connector section including an upper connecting member having a plurality of terminals provided at respective upper surfaces of the holders, and electrically connected with terminals extending from a circuit internally provided at the battery pack to a lower surface of the battery pack, a lower connecting member having a plurality of terminals each electrically connected with an associated one of battery pack circuit communication terminals provided at the PCB, and an intermediate connecting member adapted to electrically connect associated terminals of the upper and lower connecting members.

In accordance with this aspect of the present invention, it is possible to electrically connect the terminals of the battery pack circuit to respective terminals separately provided at the PCB included in the mobile communication terminal by use of the upper and lower connecting members included in the clip member by electrically connecting the terminals of the battery pack circuit to respective upper surfaces of holders included, to cover at least a part of the upper surface of a smart card, in the existing smart card mounting structure adapted to mount the smart card while electrically connecting terminals provided at the lower surface of the smart card to associated communication terminals of the microprocessor included in the mobile communication terminal, while using upper and lower connecting members (according to the present invention. For the upper and lower connecting members, elastic members having a bent structure or patterns may be used. Accordingly, it is possible to very simply implement the above described electrical connection. In association with the PCB, there is only a requirement for the PCB to be additionally provided with terminals for communication with the battery pack circuit.

In accordance with another aspect of the present invention, the PCB of the mobile communication terminal includes a first buffer for buffering data transmitted between a microprocessor provided at the PCB and the smart card, and a second buffer for buffering data transmitted between the microprocessor and the battery pack circuit.

Since the mobile communication terminal communicates with both the smart card and the battery pack circuit, buffers may be used to buffer data transmitted during the communication in accordance with the present invention. In this case, the microprocessor of the mobile communication terminal can smoothly communicate with both the smart card and the battery pack circuit.

The above objects, and other features and advantages of the present invention will become more apparent after reading the following detailed description when taken in conjunction with the drawings.

BEST MODE FOR CARRYING OUT THE INVENTION

Figure 2:
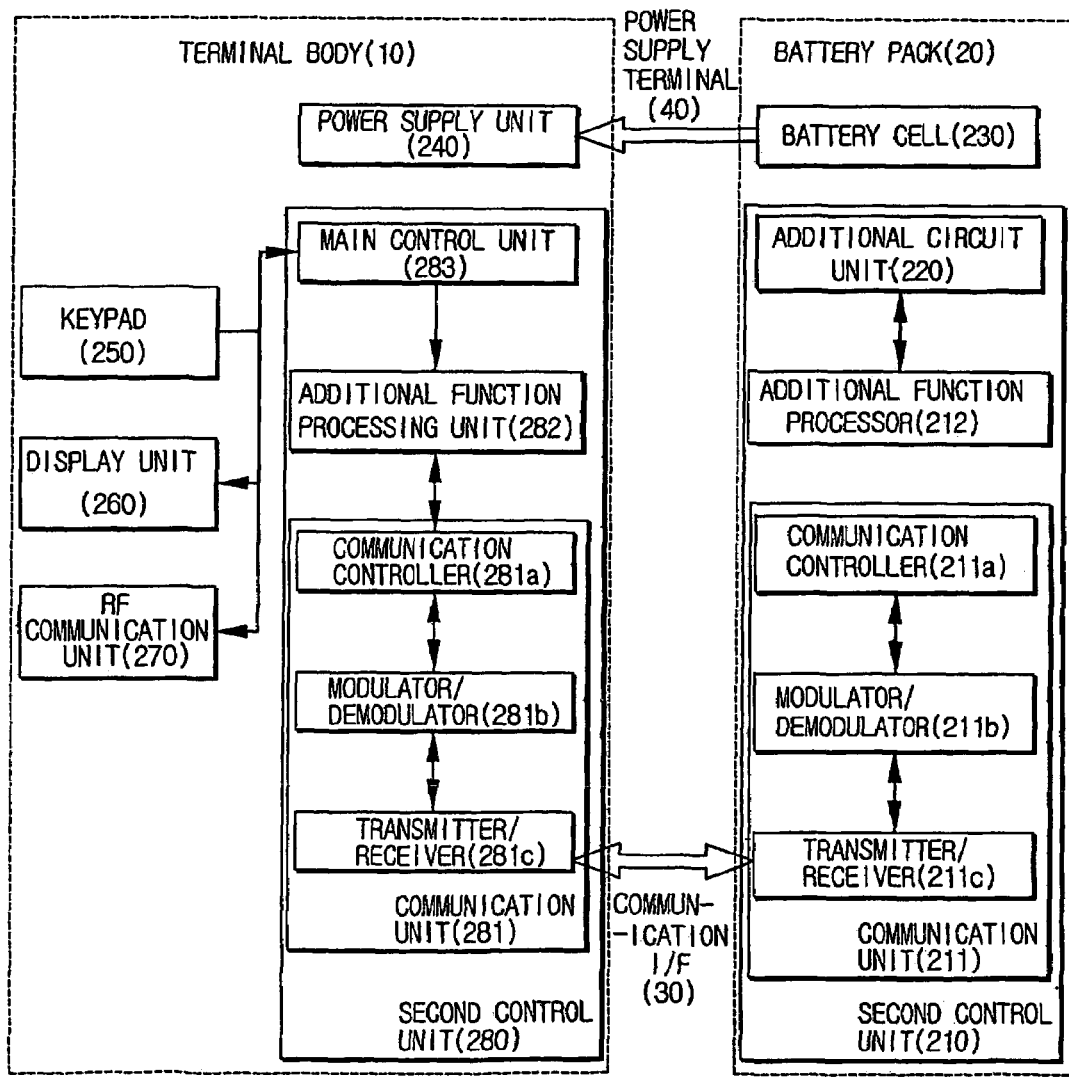
FIG. 2 is a block diagram schematically illustrating the entire configuration of a mobile communication terminal according to a preferred embodiment of the present invention.

FIG. 2 schematically illustrates the entire configuration of a mobile communication terminal according to a preferred embodiment of the present invention. As shown in FIG. 2, the mobile communication terminal according to the preferred embodiment of the present invention, which may be a mobile phone, includes a terminal body or phone body 10, and a battery pack device 20.

The terminal body 10 includes a keypad 250, a display unit 260, which may be, for example, an LCD, an RF communication unit 170, which may be, for example, a CDMA communication module, a main control unit 283 for controlling the units of the terminal body 10, and a power supply unit 240 for processing a DC power received from a battery pack via power supply terminals, and supplying the processed power to the entire system part. Since this configuration is identical to those of a conventional mobile phone, and well known in the technical field prior to the filing of the present invention, no further description will be given.

In accordance with one aspect of the present invention, the terminal body 10 also includes an additional function processing unit 282 for processing an additional function of the battery pack device 20, and a communication unit 281 for performing data transmission and reception with respect to the battery pack device 20.

The additional function processing unit 282 is implemented by program codes based on a virtual machine for mobile communication terminals, for example, a general virtual machine (GVM) or a BREU. For example, the additional function processing unit 282 controls an operation for displaying a menu through the display unit 260, and transmitting a command to the battery pack device 20 in response to a select signal from the keypad 250, in order to initiate a control operation associated with the command. In the case in which the mobile communication terminal is applied to a diagnosing apparatus, the additional function processing unit 282 also controls an operation for receiving and processing data measured by the battery pack device 20, and displaying the resultant data on the display unit 260.

The communication unit 281 includes a communication controller 281a for transforming the data obtained in accordance with the data processing operation of the additional function processing unit 282 into data having a desired transmission format, while supplying data received from the battery pack device 20 to the additional function processing unit 282. The communication unit 281 also includes a modulator/demodulator 281b for performing a modulation/demodulation for data to be sent to the communication controller 281a or received from the communication controller 281a, and a transmitter/receiver 281c for receiving modulated data received from the modulator/demodulator 281b while transmitting data, to be demodulated, to the modulator/demodulator 281b.

Each of the additional function processing unit 282, communication controller 281a, and main control unit 283 may be implemented by program codes. In this case, the program codes may be executed by a single microprocessor included in a main control chip installed in the terminal body 10.

Now, the battery pack device 20 will be described with reference to FIG. 2.

In accordance with a preferred embodiment of the present invention, the battery pack device 20 includes a plurality of battery cells 230 for supplying a DC power to the terminal body 10 through power supply terminals 40, an additional circuit unit 220 for providing an additional function to the terminal body 10, and a first control unit 210 for controlling operation of the additional circuit unit 220 while performing data transmission and reception with respect to an external device.

Figure 1:
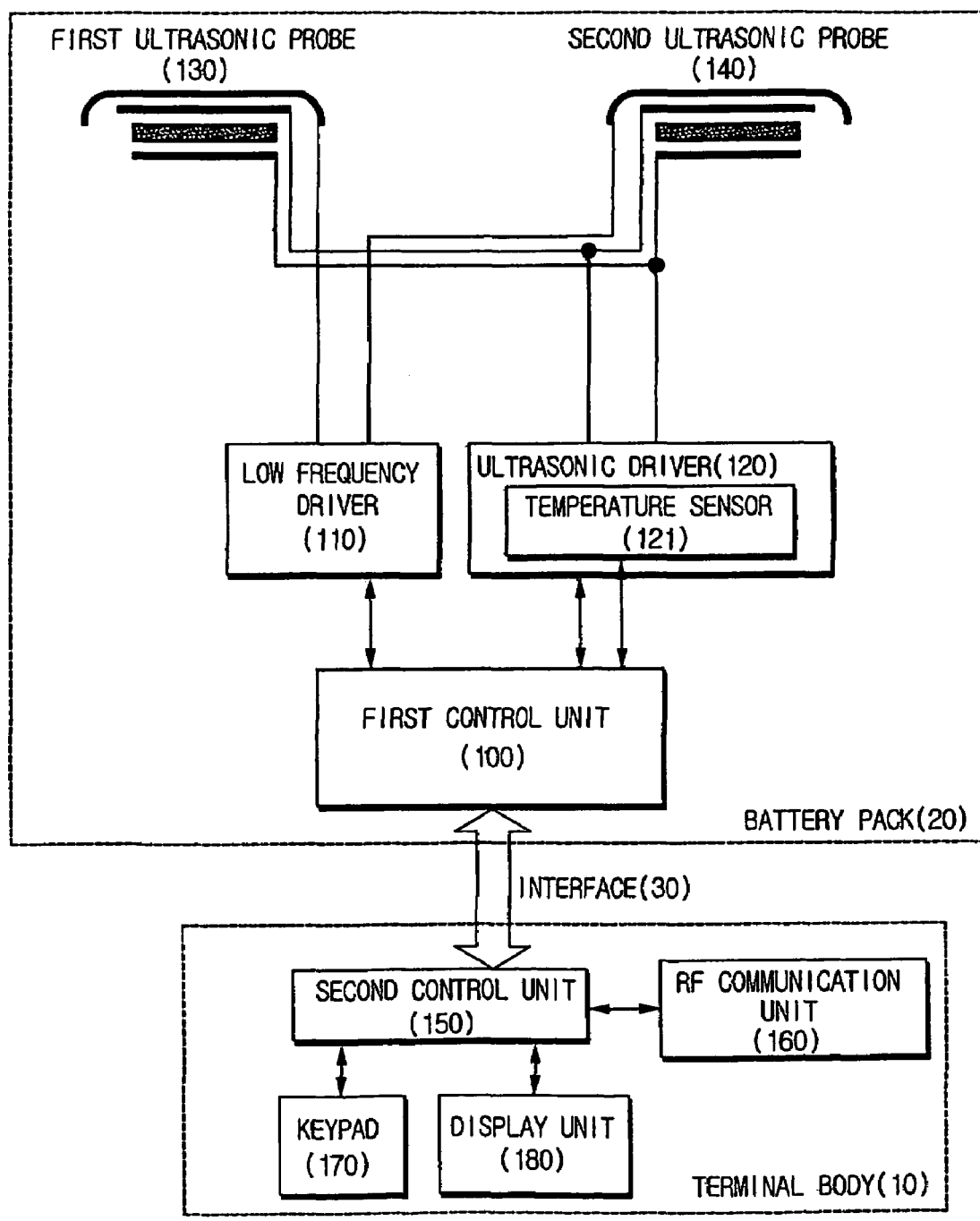
FIG. 1 is a block diagram schematically illustrating the entire configuration of a beauty care apparatus disclosed in the application previously filed in the name of the applicant.

Since the battery cells 230 and power supply terminals 40 have conventional configurations, no further description thereof will be given. The additional circuit unit 220 includes essential circuits for implementing additional functions such as music playback, therapy, and diagnosis. For example, the circuit unit 220 may include actuators or sensors such as probes or electrodes, analog circuits such as an amplifying circuit or an oscillating circuit required to supply drive signals from the actuators or sensors or drive signals to the actuators or sensors, an analog/digital converter, and a simple digital logic circuit. An example of such an additional circuit unit is illustrated in FIG. 1 associated with a conventional technique.

As shown in FIG. 2, the first control unit 210 includes an additional function processor 212 for controlling the additional circuit unit 220, and a communication unit 211 for performing data transmission and reception with respect to the terminal body 10. The additional function processor 212 may analyze a command from the terminal body 10 received via the communication unit 211, thereby directly controlling the hardware of the additional circuit unit 220. For example, where the battery pack device 20 is applied to a diagnosing apparatus, the additional function processor 212 may process data measured by the additional circuit unit 220, and transmits the resultant data to the terminal body 10 via the communication unit 211. Where the battery pack device 20 is applied to a music player, the additional function processor 212 may read out sound data from a flash memory included in the additional circuit unit 220, decompresses the read sound data, and transmits the resultant data to the terminal body 10 via the communication unit 211. In this case, the additional function processor 212 may receive a command from the terminal body 10, and performs a processing operation for transmitting a directory of sound files or playing back or deleting a desired file in accordance with the received command.

The communication unit 211 includes a communication controller 211a for transforming the data obtained in accordance with the data processing operation of the additional function processor 212 into data having a desired transmission format, while supplying data, externally received thereto, to the additional function processor 212 as an operating command. The communication unit 211 also includes a modulator/demodulator 211b for performing a modulation/demodulation for data to be sent to the communication controller 211a or received from the communication controller 211a, and a transmitter/receiver 211c for receiving modulated data received from the modulator/demodulator 211b while transmitting data, to be demodulated, to the modulator/demodulator 211b.

In a preferred embodiment of the present invention, most logic of the communication controller 211a is implemented in a software fashion in a microprocessor while using one or two of the serial ports integrated in the microprocessor in the form of a single chip. Accordingly, most logics of the additional function processor 212 and communication controller 211a are practically implemented by the same processor. Also, the modulator/demodulator 211b may be implemented by a simple analog circuit or a miniature single chip.

Hereinafter, various embodiments of the modulator/demodulator and transmitter/receiver according to various aspects of the present invention will be described in detail.

Figure 3A:
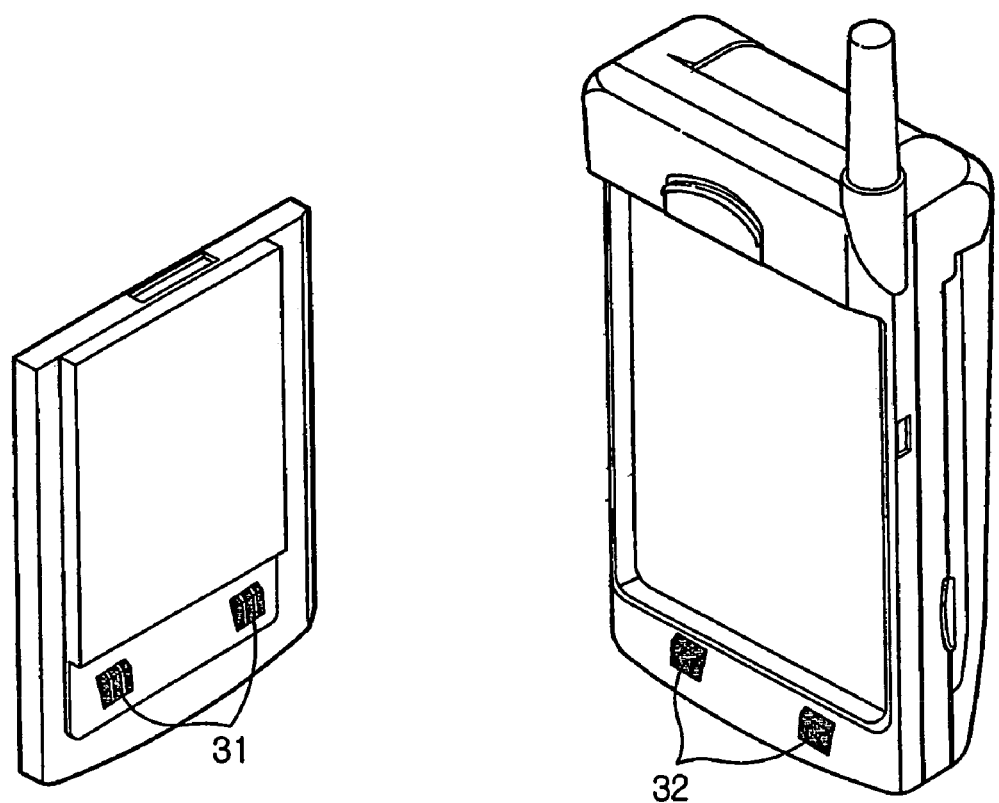
FIG. 3a is a perspective view illustrating the appearance of a transmitter/receiver according to a first embodiment of the present invention.
Figure 3B:
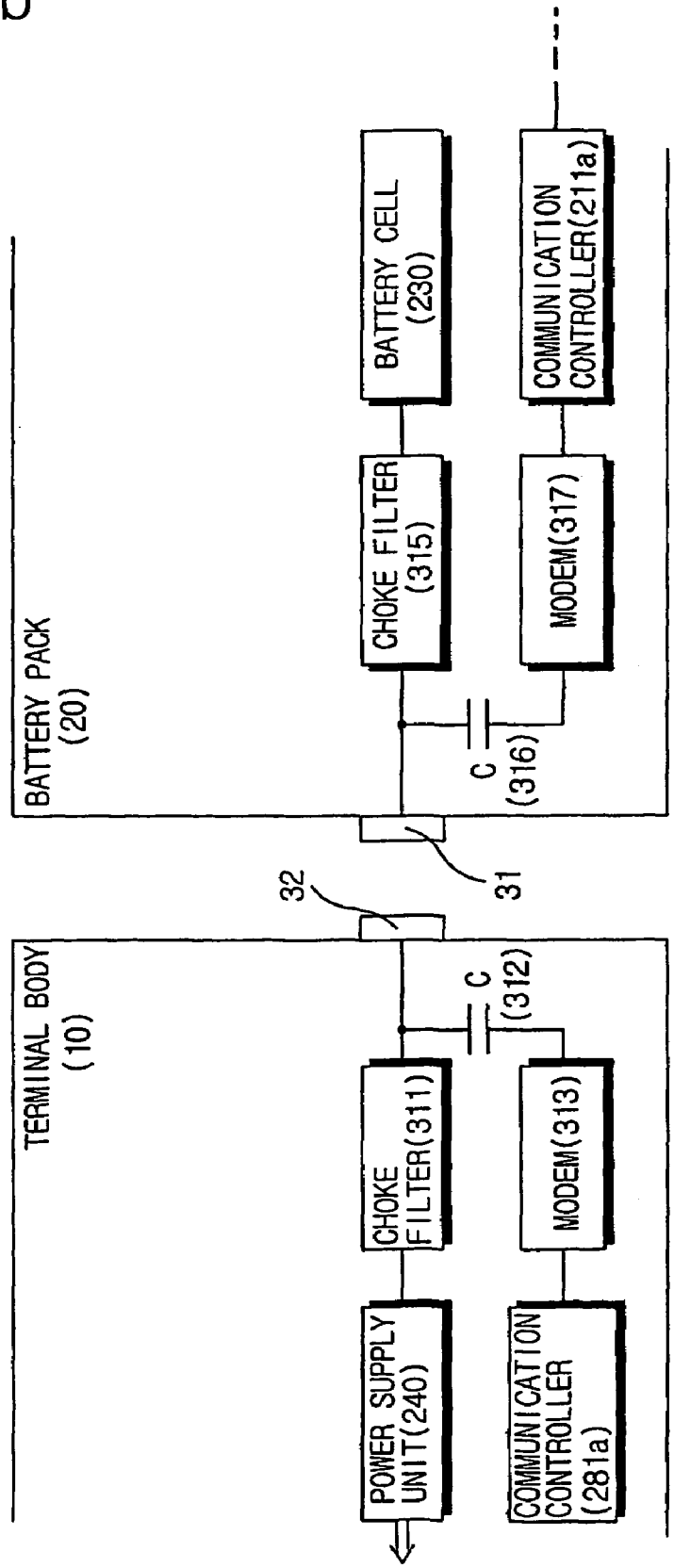
FIG. 3b is a block diagram schematically illustrating respective configurations of a modulator/demodulator and the transmitter/receiver according to the first embodiment of the present invention.

FIG. 3a illustrates the appearance of a transmitter/receiver according to a first embodiment of the present invention. FIG. 3b schematically illustrates respective configurations of the modulator/demodulator and transmitter/receiver according to the first embodiment of the present invention.

As shown in FIG. 3a, the transmitters/receivers 211c and 281c according to the first embodiment of the present invention do not include any separate communication interface terminal. In accordance with the first embodiment of the present invention, the power supply terminals 40 connected between the battery pack device 20 and the terminal body 10 are used as the communication interface terminals for the transmitters/receivers 211c and 281c.

As shown in FIG. 3b, the transmitter/receiver 211c of the battery pack device 20 includes a choke filter 315 connected between the battery cells 230 and the power supply terminals of the battery pack device 20. The power supply terminals are designated by the reference numeral 31 in FIG. 3b. The transmitter/receiver 211c also includes a capacitance element connected, at one end thereof, to a line branching from a line between the choke filter 315 and the power supply terminals 31. The capacitance element may be, for example, a capacitor 316.

On the other hand, as shown in FIG. 3b, the transmitter/receiver 281c of the terminal body 10 includes a choke filter 311 connected between the power supply unit 240 and the power supply terminals of the terminal body 10. The power supply terminals are designated by the reference numeral 32 in FIG. 3b. The transmitter/receiver 281c also includes a capacitance element connected, at one end thereof, to a line branching from a line between the choke filter 311 and the power supply terminals 32. The capacitance element may be, for example, a capacitor 312.

The choke filters 311 and 315 are adapted to cut off communication data, thereby removing noise from a DC power to be supplied to the battery cells 230 and power supply unit 240 associated therewith, respectively. The capacitors 312 and 316 are adapted to cut off DC components. A modem 313 is connected between the capacitor 312 and the communication controller 281a in the terminal body 10, whereas a modem 317 is connected between the capacitor 316 and the communication controller 211a in the battery pack device 20. Although each of the modems 313 and 317 is a modulating/demodulating circuit, it may be practically implemented only to separate received data and data to be transmitted, without performing any modulation/demodulation, because the communication between the terminal body 10 and the battery pack device 20 is a very near-distance communication. Where the communication between the terminal body 10 and the battery pack device 20 is carried out in a full-duplex manner, it is possible to use only a single line for the communication. Of course, a data ground line is also used in this case. In this case, it is necessary to perform modulation and demodulation at different frequencies in order to separate data, to be transmitted, and received data from each other. Where the communication between the terminal body 10 and the battery pack device 20 is carried out in a half-duplex manner, using only one terminal, this communication can be achieved through wirings, without requirement of any separate modulating/demodulating circuit. In this case, the separation of data, to be transmitted, and received data can be achieved in accordance with a software time division.

Therefore, the modulators/demodulators 211b and 281b should not be construed as being limited to general modulating/demodulating circuits. That is, the modulators/demodulators should be construed as having extended functions in so far as they can carry out transmission and reception of analog signals even through they cannot perform substantial modulation and demodulation. Only two terminals can be provided at the power supply line. Accordingly, the two terminals of the power supply line can be used for transmission and reception of data, respectively. Alternatively, the two terminals of the power supply line may be used for data and a control signal, respectively.

In the battery pack device according to this embodiment of the present invention, its power supply terminals and communication terminals are integrated with each other. Accordingly, there is an advantage in that the battery pack device can communicate with the terminal body only by addition of a very simple analog element thereto and addition of a modulator/demodulator of a relatively very low level, without any separate terminal for data transmission and reception.

Figure 4:
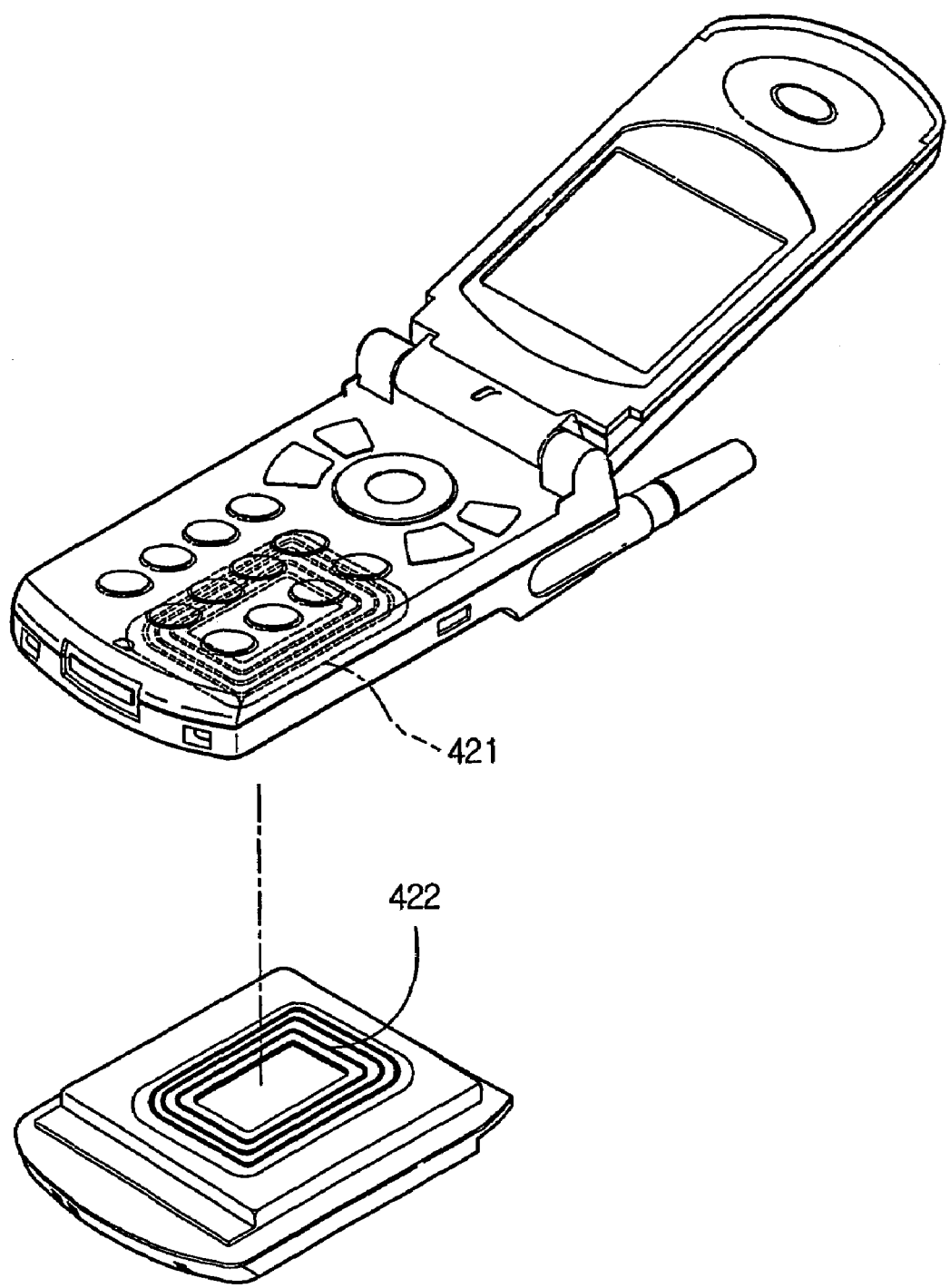
FIG. 4 is a perspective view schematically illustrating the configuration of a transmitter/receiver according to a second embodiment of the present invention.

FIG. 4 schematically illustrates the configuration of a transmitter/receiver according to a second embodiment of the present invention. In accordance with this embodiment, the transmitters/receivers 211c and 281c are characterized in that they comprise coils 421 and 422 arranged at respective facing coupling surfaces of in the battery pack device 20 and terminal body 10 such that they face each other to form a transformer. Here, the term "transformer" means at least a pair of coils each having a plurality of coil turns while being capable of transmitting an electrical signal through a certain gap in accordance with an inductive coupling therebetween. In the structure according to the present invention, it is difficult to make these coils have a common metallic magnetic core.

In accordance with a preferred embodiment of the present invention, each coil has the form of a coreless coil bundle having a plurality of coil turns while having an integrated structure using a resin to obtain an improved insulation between adjacent coil turns. Each coil also has a hollow thin plate structure in order to prevent an excessive increase in the thickness of the terminal body. In order to optimize the inductive coupling between the coils, the coil installed at the side of the terminal body 10 is arranged in the form of a plate extending along the surface of the terminal body 10 facing the battery pack device 20. Similarly, the coil installed at the side of the battery pack device 20 is arranged in the form of a plate extending along the surface of the battery pack device 20 facing the terminal body 10 so that it accurately faces the coil of the terminal body 10 when the battery pack device 20 is coupled to the terminal body 10.

In accordance with this embodiment of the present invention, each of the modulators/demodulators 211b and 281b adopts a certain FM system in which digital data is modulated into two frequencies. The resultant digital signal may be demodulated in accordance with a software determination through a frequency detector, for example, a binarization circuit such as a phase locked loop (PLL) circuit or a Schmidt trigger circuit.

In the battery pack device according to this embodiment of the present invention, for data transmission and reception, the coil thereof is attached to the surface of the battery pack device facing the terminal body such that it is arranged in the form of a plate extending along the surface of the battery pack device. In accordance with an inductive coupling of the coil to the coil of the terminal body, data communication can be achieved between the battery pack device and the terminal body. Accordingly, there is an advantage in that the battery pack device can communicate with the terminal body simply by addition of a very simple analog element thereto and addition of a modulator/demodulator of a very low level, without any modification of the mold for fabricating the battery pack device. Since the coils forming a transformer are arranged to be closely approximate to each other, the modulators/demodulators of the battery pack device and terminal body can adopt an FM system of a relatively low frequency.

In accordance with a third embodiment of the present invention, each of the modulators/demodulators 211b and 281b is a Bluetooth RF transmitting/receiving module, whereas each of the transmitters/receivers 211c and 281c is a helical antenna made of a ceramic dielectric.

The tendency of recently developed mobile communication terminals is to install a Bluetooth module of a chip level or terminal level therein. Such a Bluetooth module provides a wireless link for data communication between the battery pack device 20 and the terminal body 10. Bluetooth communication adopts a Gaussian frequency shift keying (GFSK) modulation at 2.4 GHz. Although there is also a Bluetooth protocol stack for channel communication and data and voice communication, the Bluetooth module adopts only the GFSK modulator/demodulator in accordance with this embodiment of the present invention. In this case, digital data is directly inputted to or outputted from the GFSK modulator/demodulator of the Bluetooth module.

In pace with recent development of mobile communication terminals having a Bluetooth function, techniques associated with a very small antenna have been developed. Other techniques have also been known which are associated with an antenna having a structure including a square bar-shaped ceramic dielectric, and a helical conductor covering the surface of the ceramic dielectric. Although the present invention is not limited to such antennas, it is preferable to use an antenna provided at a mobile communication terminal to which the present invention is applied.

In accordance with such an aspect of the present invention, the battery pack device of the present invention has advantages in that it is possible to minimize provision of additional circuits, and it is unnecessary to modify the mold used to fabricate the terminal body.

In accordance with a fourth embodiment of the present invention, each of the transmitters/receivers 211c and 281c is an infrared (IR) transmitter/receiver installed at an opening formed at an associated one of the facing surfaces of the battery pack device 20 and terminal body 10. In accordance with this embodiment of the present invention, each of the modulators/demodulators 211b and 281b comprises a single IR chip. IR chip sets supporting bi-directional communications have been known prior to the filing of the present invention, and are commercially available. A transparent open window is formed at the surface of the terminal body 10 facing the battery pack device 20. Similarly, a transparent open window is formed at the surface of the battery pack device 20 facing the terminal body 10. IR light emitting/receiving elements are installed at the transparent open windows, respectively.

In accordance with a fifth embodiment of the present invention, the transmitters/receivers 211c and 281c comprise connecting pins protruded from the battery pack device 20, and an electrode plate attached to the terminal body, respectively. The connecting pins can elastically come into electrical contact with the electrode plate. Typically, the electrical connection between the terminal body and the battery pack device is achieved by a protruded elastic electrode installed at the terminal body and an electrode installed at the battery pack device. In order to minimize the modification of the mold used to fabricate the terminal body, however, the electrode plate is installed at the terminal body because it can be relatively easily installed while occupying a small space. For the same purpose, the connecting pins are also installed at the battery pack device. In this case, it is possible to easily apply a new technique to the terminal body and battery pack device.

Now, embodiments of the present invention adapted to accomplish the object of the present invention to reduce the consumption of electric power will be described with reference to FIGS. 5, 6, and 7.

Figure 5:
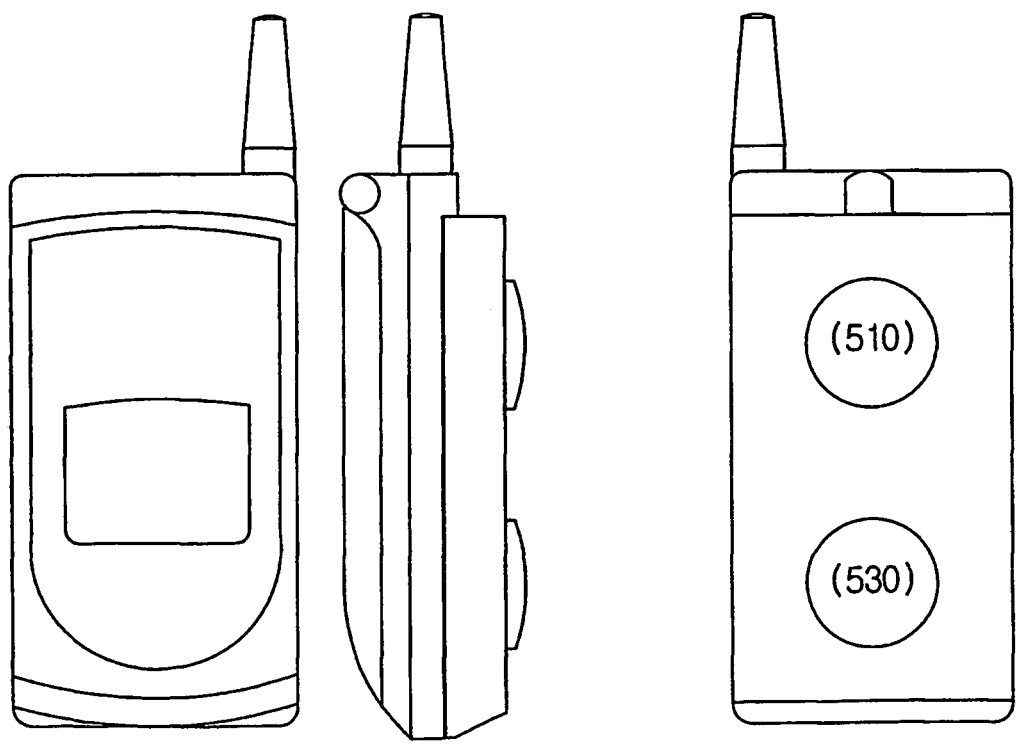
FIG. 5 schematically illustrates the appearance of a beauty care apparatus according to an embodiment of the present invention, in the form of front, side and rear views.

FIG. 5 schematically illustrates the appearance of a beauty care apparatus according to an embodiment of the present invention, in the form of front, side and rear views. This embodiment relates to a mobile communication terminal having an ultrasonic therapy function. This embodiment is made only for illustrative purposes, and the present invention is not construed as being limited to this embodiment. For instance, the present invention may be applied to various battery pack devices each including a control unit for controlling additional functions provided at the battery pack device, and additional circuits, for example, battery pack devices disclosed in Korean Patent Application Nos. 2002-53004, 2002-52994, 2002-52995, and 2002-52996 filed in the name of the applicant, and battery pack devices having an MP3 function, as mentioned above in conjunction with the background art.

In accordance with this embodiment of the present invention, electrodes 510 and 530 for ultrasonic therapy are provided at the outer surface of a battery pack, as shown in FIG. 5. The user may select an ultrasonic therapy function from a function menu displayed on a mobile communication terminal, to which the battery pack is coupled. After selecting a desired level of the ultrasonic therapy function, the user may enter a start command. When the user subsequently brings the ultrasonic probes electrodes into contact with the skin, for example, the skin of the face, the beauty care apparatus detects this contact, thereby supplying ultrasonic waves to the electrodes 510 and 530.

Figure 6:
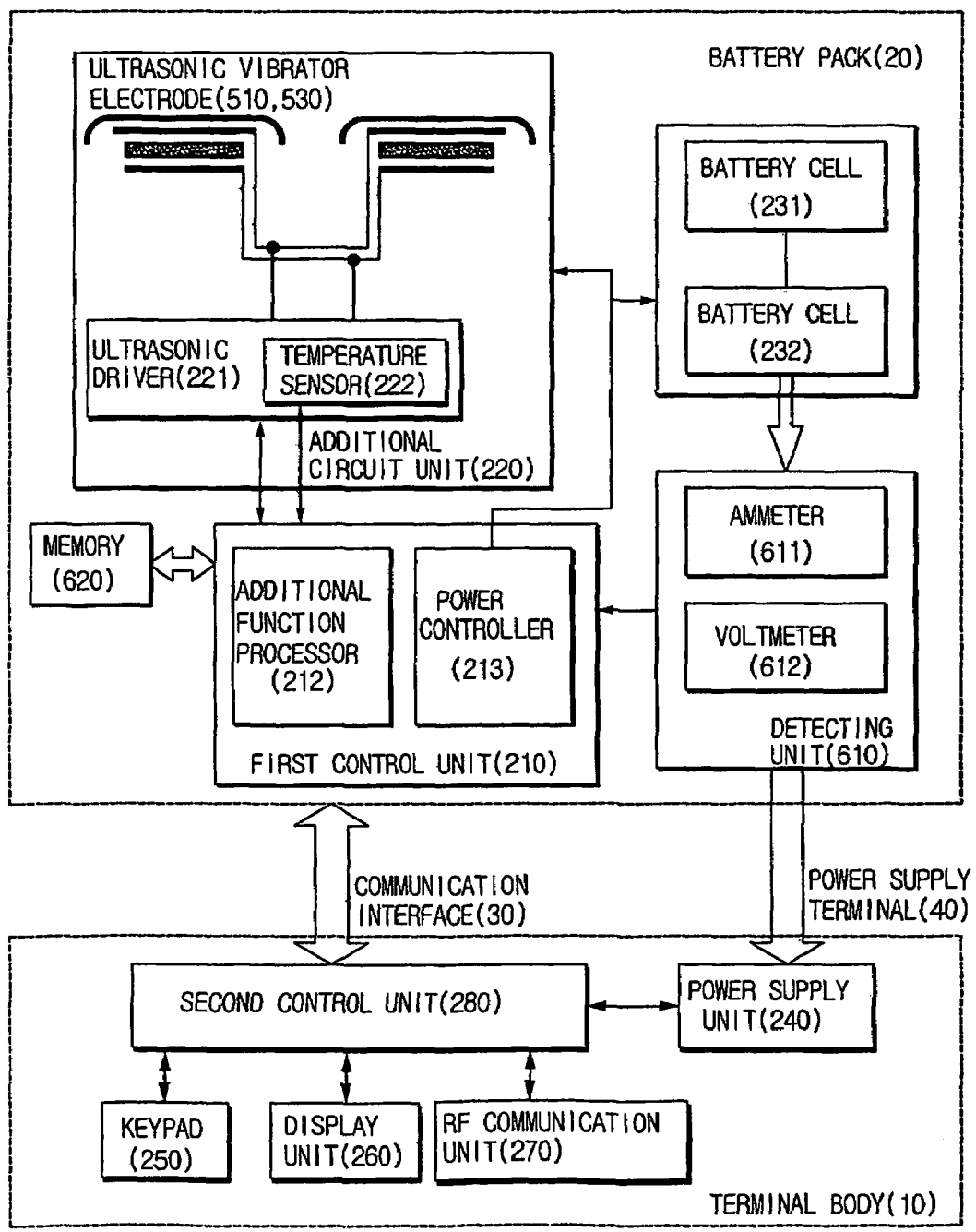
FIG. 6 is a block diagram schematically illustrating the entire structure of the beauty care apparatus according to the illustrated embodiment of the present invention.

FIG. 6 is a block diagram schematically illustrating the entire structure of the beauty care apparatus according to the illustrated embodiment of the present invention.

As shown in FIG. 6, the beauty care apparatus includes a terminal body 10, a battery pack device 20, and a communication interface 30 adapted to interface the terminal body 10 and the battery pack device 20. The battery pack device 20 includes power supply terminals 40 for supplying electric power to the terminal body 10, at least one battery cell (two battery cells 231 and 232 in the illustrated case) adapted to supply a DC power to the power supply terminals 40, a detecting unit 610 for detecting the electric power supplied to the power supply terminals 40, a memory 620 for storing a main program therein, an additional circuit unit 220 for providing additional functions to the terminal body 10, and a first control unit 210 controlled by the main program. The control unit 210 includes an additional function processor 212 for controlling the additional circuit unit 220, based on operating data received from the communication interface 30, and a power controller 213 for controlling respective power consumption levels of the circuits at the side of the battery pack device 20 in accordance with the electric power detected by the detecting unit 610.

In a preferred embodiment of the present invention, an application program to be executed based on a virtual machine is loaded in the terminal body 10, in order to control the ultrasonic therapy function. The terminal body 10 includes a second control unit 280 adapted to communicate with the first control unit 210 of the battery pack device 20 through the communication interface 30. The second control unit 280 may be an integrated control chip typically included in a mobile phone, for example, a general-purpose microprocessor included in an MSM series chip manufactured by Qualcomm Incorporated. The terminal body 10 also includes a keypad 250 for inputting an operating command from the user for execution of an additional function or a function other than the additional function, and a display unit 260 for displaying information of an operation being carried out, and resultant data of the operation. In addition, the terminal body 10 includes a power supply unit 240 having hardware and software configurations for managing the consumption of electric power thereof. Such a hardware configuration of the terminal body 10 has been well known in the technical field prior to the filing of the present invention. Diverse techniques associated with an application program based on a virtual machine have been widely distributed. Accordingly, those skilled in the art may easily implement the hardware configuration and application program, using the known techniques.

The battery pack device 20 includes a plurality of general battery cells. In the illustrated embodiment, two battery cells 231 and 232 are used. The battery pack device 20 supplies a DC power from the battery cells 231 and 232 to the terminal body 10 via the power supply terminals 40. In accordance with an embodiment of the present invention, the communication interface 30 is installed at the battery pack device 20. In accordance with a preferred embodiment of the present invention, the communication interface 30 and the power supply terminals 40 are implemented by a physically single connector. This connector may have connector sections respectively provided at coupling surfaces of the battery pack and terminal body. When the battery pack 20 is coupled to the terminal body 10, electrical connection between the battery pack 20 and the terminal body 10 is achieved by the connector sections of the connector. In the illustrated embodiment of the present invention, the communication interface 30 is implemented by a USB serial communication protocol. However, the communication interface 30 may be extended to various external interfaces supported by the terminal body 10, without being limited to the USB serial communication protocol, in accordance with the present invention.

In accordance with an aspect of the present invention, the detecting unit 610 is provided to detect the electric power supplied from the battery cells 231 and 232 to the terminal body 10. The detecting unit 610 may include an ammeter 611 for detecting the current supplied to the terminal body 10. At a substantially constant voltage, the amount of supplied current may be a prominent factor for indirectly recognizing the operating state of the terminal body. The detecting unit 610 may additionally include a voltmeter 612. This voltmeter 612 may provide basic data for checking the charged states of the battery cells 231 and 232.

The additional circuit unit 229 may include diverse circuits in accordance with additional functions supported by the battery pack device 20. The additional circuit unit 229 includes analog circuits and/or digital circuits. In the illustrated embodiment of the present invention, the additional circuit unit 220 includes an ultrasonic driver 221 for generating an ultrasonic drive signal in accordance with a control signal from the first control unit 210, and ultrasonic vibrator electrodes 510 and 530 for applying an electric field to electrodes attached to opposite surface of a piezoelectric ceramic vibrator, in accordance with the ultrasonic drive signal from the ultrasonic driver 221, thereby generating ultrasonic vibrations. Under the condition in which the ultrasonic vibrator electrodes 510 and 530 are maintained without coming into contact with the skin, the ultrasonic vibrations generated from the ultrasonic vibrator electrodes 510 and 530 may cause generation of unnecessary heat, thereby causing unnecessary power consumption. In order to solve this problem, it is necessary to provide a circuit for detecting the state of the ultrasonic vibrator electrodes 510 and 530 coming into contact with the skin. This detecting circuit may be a temperature sensor 222. For such an ultrasonic skin beauty care circuit including the above described ultrasonic driving circuit and vibrators, various types have been known prior to the filing of the present invention. Accordingly, no further detailed description of such an ultrasonic skin beauty care circuit will be given.

The first control unit 210 controls the entire circuit of the battery pack device 20. In a preferred embodiment of the present invention, the first control unit 210 is a general-purpose microprocessor internally provided, in the form of one chip, with an analog/digital (A/D) converter of multiple channels for converting an analog signal from the detecting unit 610 into a digital signal, an EEPROM for storing a necessary core program therein, and an interface circuit for the communication interface 30. Such a microprocessor is commercially available from various manufacturers.

The memory 620 may be included in the same chip as the first control unit 210. In this memory 620, a main program required to control the battery pack device 20 is stored. The main program includes program routines required to provide respective additional functions, and a program routine required to provide a power control function according to an aspect of the present invention. In accordance with execution of such programs, the additional function processor 212 of the first control unit 210 may provide various additional functions, for example, ultrasonic beauty care, low frequency therapy, MP3 music play, and karaoke functions. The first control unit 210 may control management of electric power by a power controller 213.

Hereinafter, processing operations carried out by the application program adapted to control the second control unit 280 and the main program stored in the memory 620 to control the fist control unit 210 will be described. When the second control unit 280 recognizes selection of an additional function menu in accordance with an operation of scanning the keypad 250 under the control of the application program loaded in the terminal body 10, it displays a list of possible additional functions on the display unit 260. When an ultrasonic skin beauty care function is subsequently selected through the keypad 250, the second control unit 280 requests, via the communication interface 30, the battery pack device 20 to execute the ultrasonic skin beauty care function.

In response to the request, the first control unit 210 loads a routine for providing additional functions, and then executes a sub-routine, corresponding to a selected additional function, branched from the routine after starting the routine, or directly loads a routine for providing the selected additional function. Thus, the selected additional function is processed by the additional function processor 212. For the processing of the additional function, the first control unit 210 periodically reads data from the temperature sensor 222. When the first control unit 210 determines that the ultrasonic vibrator electrodes 510 and 530 have come into contact with the skin, it sends a drive signal to the ultrasonic driver 221. In accordance with the drive signal, the ultrasonic driver 221, which includes an analog oscillating circuit and an amplifying circuit, begins to oscillate. Thus, the ultrasonic driver 221 applies a drive voltage to the ultrasonic vibrator electrodes 510 and 530 which, in turn, generate ultrasonic vibrations.

Meanwhile, where there is no request to execute any additional function, the power controller 213 operates. The power controller 213 periodically operates irrespective of the condition in which the first control unit 210 is in an active mode exhibiting high power consumption, an inactive mode exhibiting minimum power consumption, or a suspended mode exhibiting little or no power consumption. The power controller 213 reads data from the ammeter 611 of the detecting unit 610, thereby measuring the amount of current supplied to the terminal body 10 via the power supply terminals 40. When the measured current amount is less than a predetermined value, it means that the mobile communication terminal is in an inactive mode. In this state, there is no possibility that the additional functions provided at the battery pack device 20 are used. In this case, accordingly, the power controller 213 may cut off the electric power supplied to the circuits of the battery pack device 20, in order to reduce the power consumption thereof.

Mobile communication terminals or mobile phones periodically communicate with base stations even in an inactive state thereof, so that the power consumption thereof may vary even in the active state. In order to accurately detect such a power consumption variation, it is desirable to determine the amount of current supplied to the terminal body, taking into consideration the current charged state of the battery. To this end, in accordance with the illustrated embodiment of the present invention, the detecting unit 610 includes the voltmeter 612 in order to detect the charged state of the battery.

For the power management mode thereof, the power controller 213 may simply have two modes, that is, a mode, in which the electric power to be supplied to the additional circuits is completely cut off, and a mode, in which the electric power is completely supplied. In order to achieve such modes, an analog switch may be installed on a power line adapted to supply electric power to the entire block of the ultrasonic drive unit 221 so that the supply of electric power is carried out via the analog switch. In this case, the first control unit 210 is configured to control the analog switch, thereby controlling the supply of electric power to the additional circuits. Most integrated microprocessors support a power management mode for peripheral circuits included in devices using those integrated microprocessors. Accordingly, it is possible to efficiently manage the consumption of electric power by using such an integrated microprocessor while additionally controlling the microprocessor in accordance with a certain software program. It is also possible to more efficiently manage the consumption of electric power by controlling the power supply clock of the microprocessor, thereby controlling the power consumption of the microprocessor. Such a power management technique for peripheral devices and microprocessors has been known prior to the filing of the invention, so that no detailed description thereof will be given.

Figure 7:
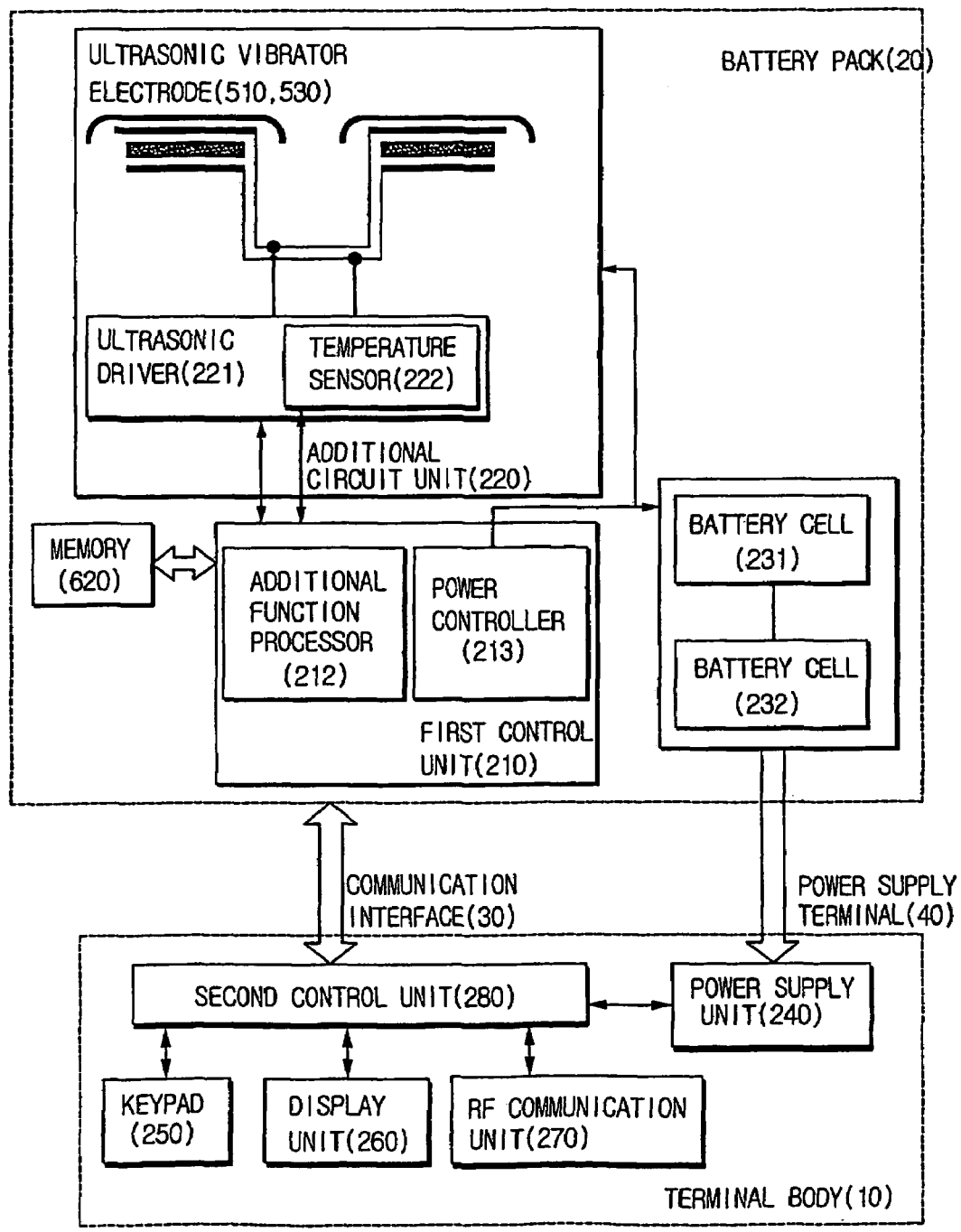
FIG. 7 is a block diagram schematically illustrating a mobile communication terminal including a battery pack device according to another embodiment of the present invention.

FIG. 7 is a block diagram schematically illustrating a mobile communication terminal including a battery pack device according to another embodiment of the present invention. In FIG. 7, constitutive elements respectively identical or corresponding to those of the above described embodiment are designated by the same reference numerals.

In accordance with this embodiment, the mobile communication terminal includes a terminal body 10, a battery pack device 20, and a communication interface 30 adapted to interface the terminal body 10 and the battery pack device 20, as shown in FIG. 7. The battery pack device 20 includes power supply terminals 40 for supplying electric power to the terminal body 10, at least one battery cell (two battery cells 231 and 232 in the illustrated case) adapted to supply a DC power to the power supply terminals 40, a memory 620 for storing a main program therein, an additional circuit unit 220 for providing additional functions to the terminal body 10, and a first control unit 210 controlled by the main program. The control unit 210 includes an additional function processor 212 for controlling the additional circuit unit 220, based on operating data received from the communication interface 30. This configuration is similar to that of the embodiment illustrated in FIG. 6. In accordance with this embodiment, the control unit 210 further includes a power controller 213 for controlling respective power consumption levels of the circuits at the side of the battery pack device 20 in accordance with a power management mode command associated with the terminal body 10 and received from the communication interface 30.

In accordance with this embodiment, the supply of electric power is controlled, based on the determination of the program executed at the side of the terminal body 10, as compared to the above described embodiment in which the supply of electric power is controlled, based on the detected result from the detecting unit. That is, since at least one application program is currently executed in the terminal body 10, it is possible to check the power management mode of the terminal body 10 through the currently executed application program at the side of the terminal body 10 in a periodic manner or every time an event is generated. When the power management mode of the terminal body 10 is changed, command data is transmitted to the battery pack device 20, in order to instruct the battery pack device 20 to change its power management mode to a mode identical or corresponding to that of the terminal body 10. Accordingly, the power controller 213 included in the first control unit 210 controls the hardware for its power management, for example, the analog switch described in the above described embodiment, thereby cutting off the electric power supplied to the additional circuit unit 220 while controlling its clock. The power controller 213 also cuts off the electric power supplied to integrated peripheral circuits in accordance with the above control operation.

Now, embodiments of an interface connector usable in a mobile communication terminal internally provided with a chip card in accordance with the present invention will be described with reference to FIG. 8.

Figure 8:
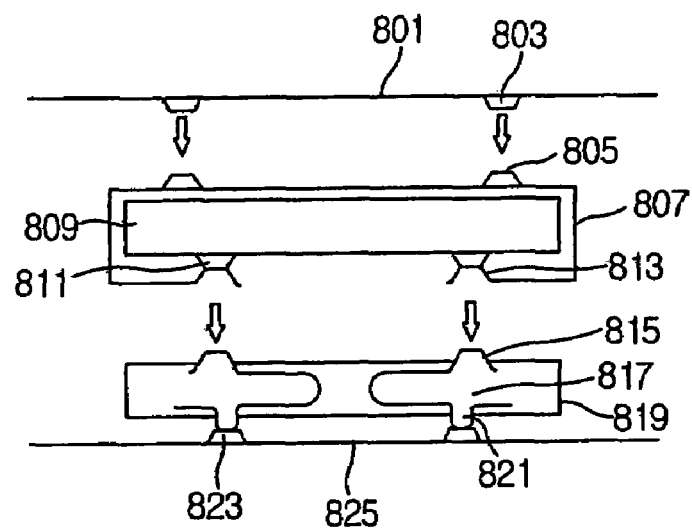
FIGS. 8 to 11 are sectional views respectively illustrating various examples of a communication connector for connecting a circuit internally provided at a battery pack and the body of a mobile communication terminal in accordance with the present invention.

FIG. 8 is a sectional view illustrating an example of a communication connector for connecting a circuit internally provided at a battery pack and the body of a mobile communication terminal.

As shown in FIG. 8, the communication connector includes a first connector section including a housing 819 having an outer structure of a certain shape, and terminal members 817 provided at the housing 819. Each of the terminal members 817 is electrically connected, at one end 815 thereof, with an associated one of terminals provided at the lower surface of a smart card 809, while being electrically connected, at the other end 821 thereof, with an associated one of terminals 823 provided at a printed circuit board (PCB) 825 of the mobile communication terminal. The communication connector also includes a second connector section including a clip member 807 for receiving the smart card 809 such that it is in close contact with at least a part of the upper/lower surface of the smart card 809 while covering the upper/lower surface part, an upper connecting member 805 provided at the upper surface of the clip member 807 while having a plurality of terminals each electrically connected with an associated one of terminals 803 extending from a circuit internally provided at a battery pack 801 to the lower surface of the battery pack 801, a lower connecting member 813 provided at the lower surface of the clip member 807 while having a plurality of terminals each electrically connected with an associated one of terminals 811 provided at the lower surface of the smart card 809, and an intermediate connecting member (not shown) adapted to electrically connect associated terminals of the upper and lower connecting members 805 and 813.

The first connector section corresponds to a well-known smart card connector (socket) used for electrical connection between the terminals 811 provided at the lower surface of the smart card 809 and the terminals 823 provided at the PCB 825 of the mobile communication terminal body. Accordingly, no detailed description of the first connector section will be given.

In accordance with the present invention, the smart card 809 is inserted in the clip member 807. For example, the smart card 809 is forcibly fitted in the clip member 807. The clip member 807 is adapted to electrically connect the terminals 823 of the PCB 825, hidden by the smart card 809, to a mounting surface on which the battery pack 801 is to be mounted. The upper surface of the clip member 807 provides the mounting surface on which the battery pack 801 is to be mounted. The terminals 803 of the battery pack circuit are electrically connected to the terminals 811 of the smart card 809 by the upper and lower connecting members 805 and 813 provided at the clip member 807, and the intermediate connecting member, respectively. Accordingly, the clip member 807 electrically connects the terminals 823 of the PCB 825 to the terminals 803 of the battery pack circuit.

Figure 12:
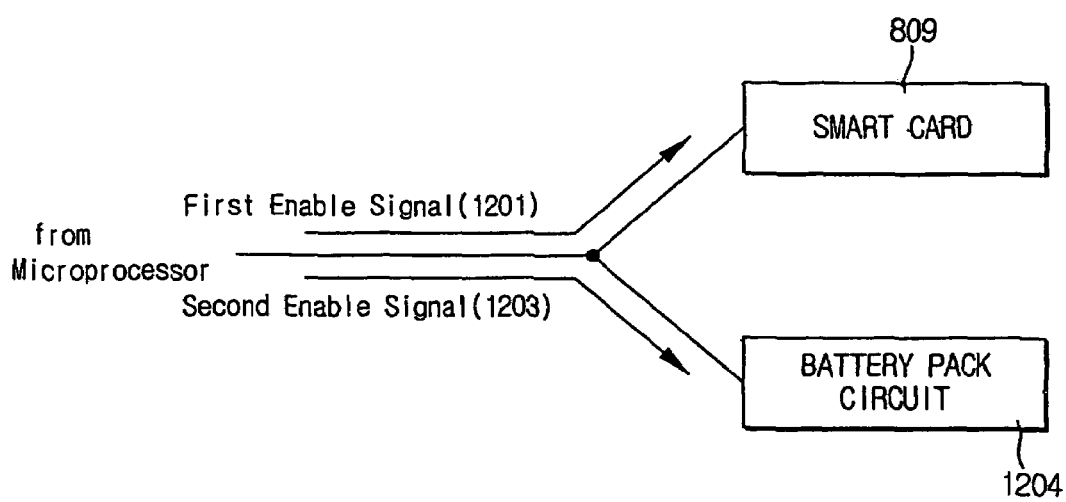
FIG. 12 is a block diagram illustrating the connection of a microprocessor included in the terminal body with the battery pack circuit and a smart card in accordance with an embodiment of the present invention.

In accordance with a further aspect of the present invention, the PCB 825 of the mobile communication terminal includes a microprocessor (not shown) for outputting a first enable signal 1201 to the smart card 809 while outputting a second enable signal 1203 to the internal circuit 1204 of the battery pack 801 (FIG. 12).

That is, the microprocessor provided at the terminal body outputs different enable signals to the smart card and battery pack circuit electrically connected to the microprocessor via the same terminal, respectively. In response to an enable signal from the microprocessor, only an associated one of the smart card and battery pack circuit operates. Accordingly, there is no collision of data being transmitted in a software manner.

Figure 17:
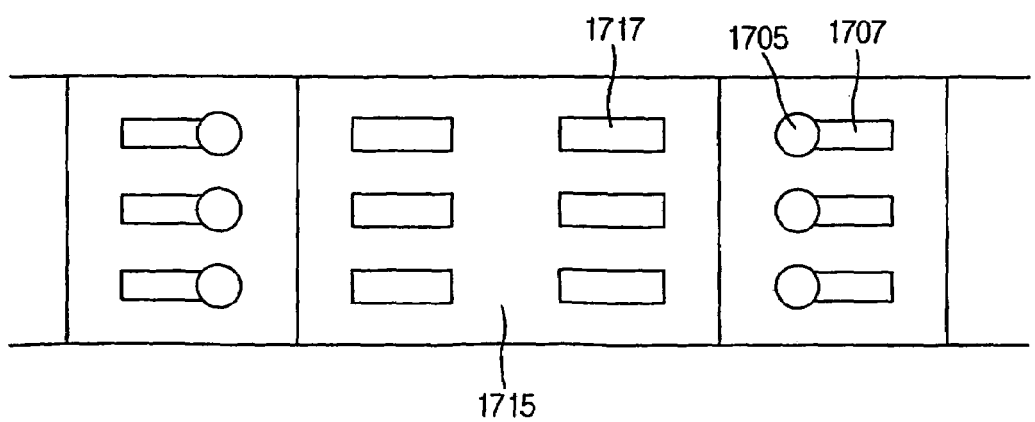
FIG. 17 is a plan view illustrating the structure of the communication connector according to the present invention.
Figure 18:
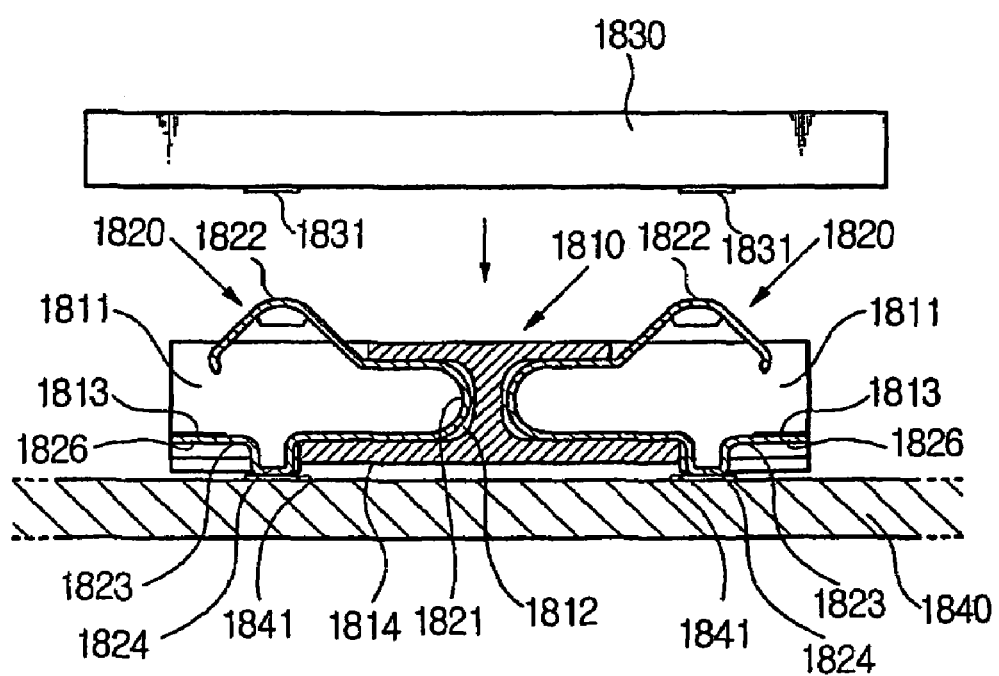
FIGS. 18 to 22 are views respectively illustrating configurations for mounting the smart card to the terminal body.
Figure 19:
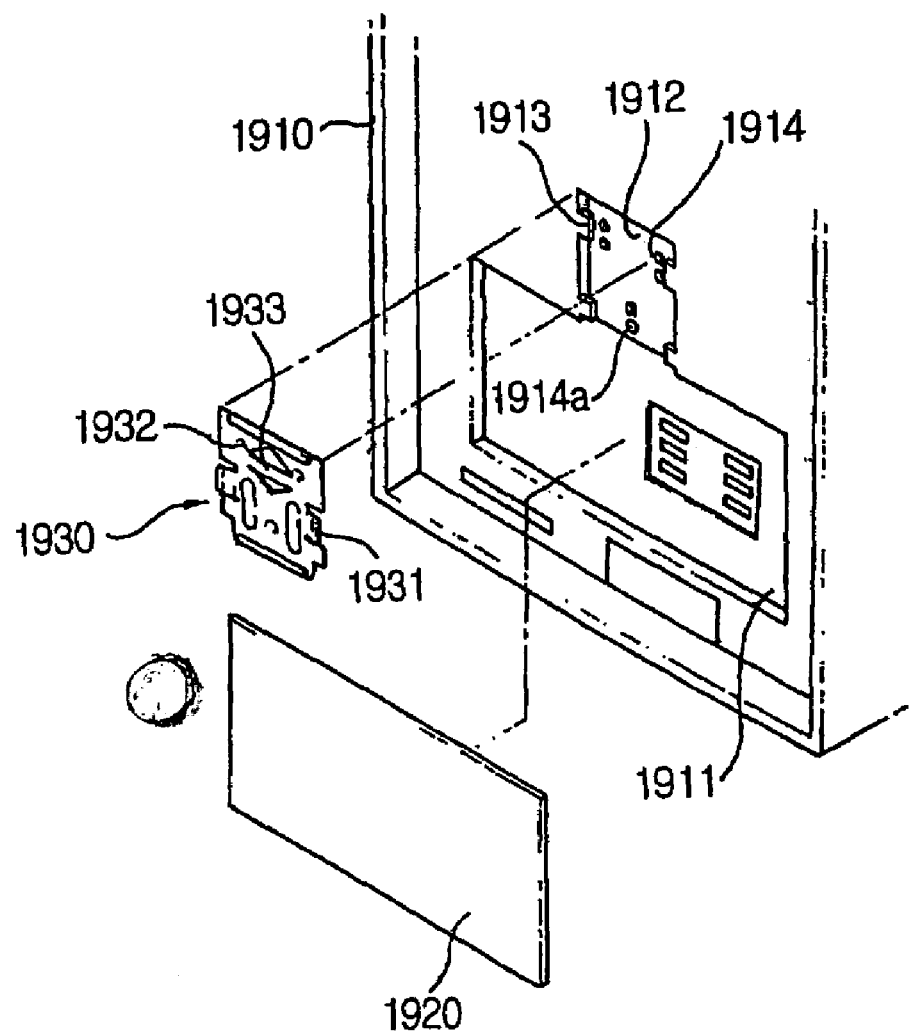
Figure 20:
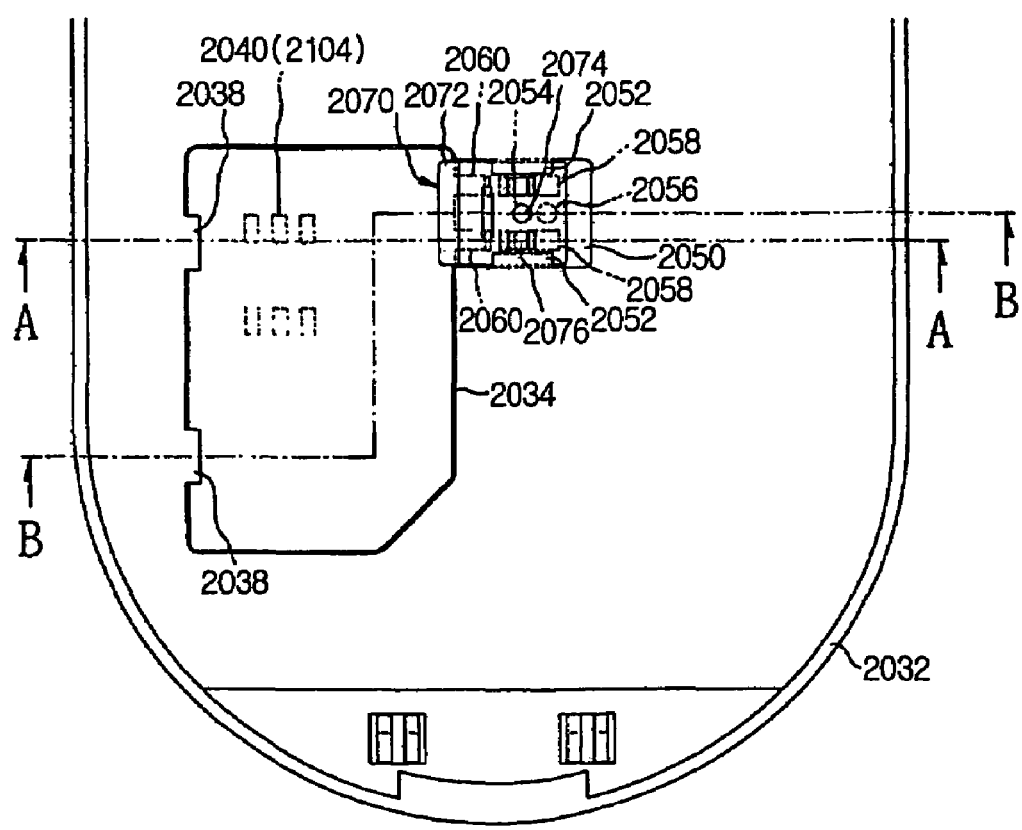
Figure 21:
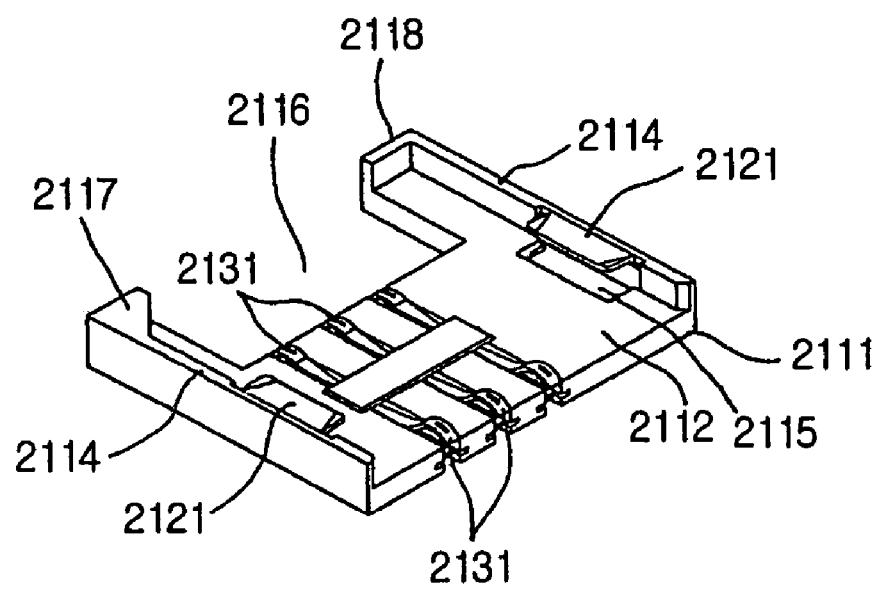
Figure 22:
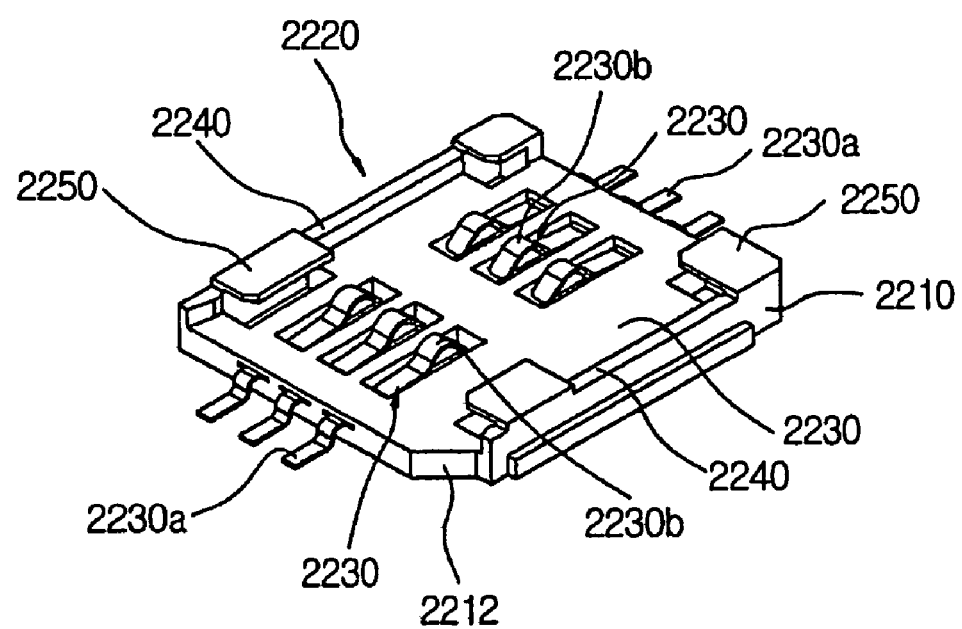

In accordance with another aspect of the present invention, the intermediate connecting member comprises patterns printed on a surface of the clip member 807. These patterns are illustrated in FIG. 17 while being designated by the reference numeral 1707. Since the upper and lower connecting members 805 and 813 of the clip member 807 are electrically connected by the printed patterns, it is possible to very simply implement a communication connector structure without any modification of the existing smart card mounting structure.

Figure 9:
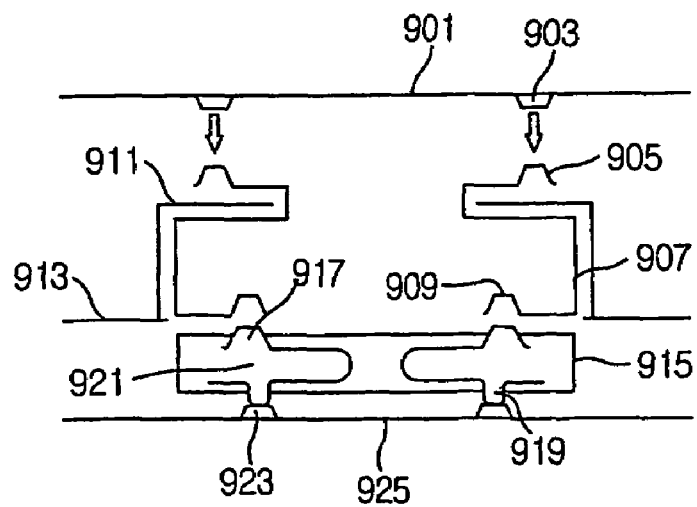
Figure 10:
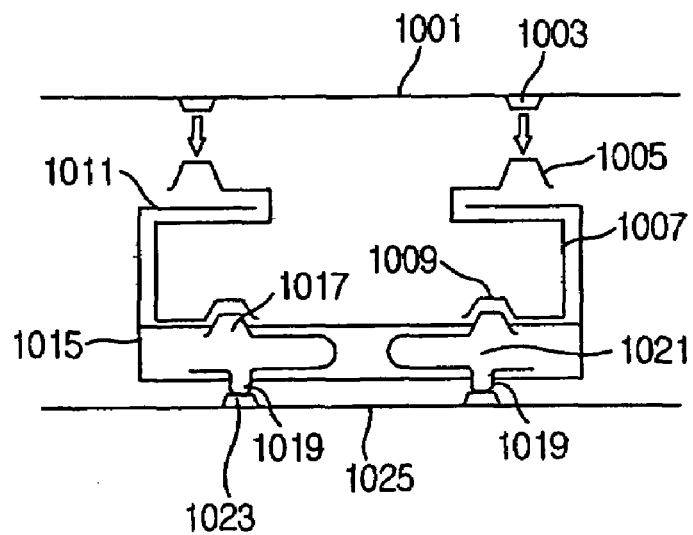
Figure 11:
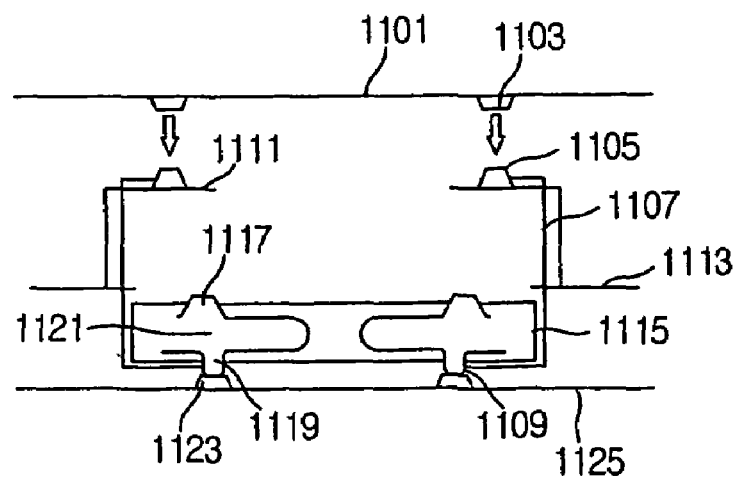

FIGS. 9 to 11 are sectional views each illustrating another example of a communication connector for connecting a circuit internally provided at a battery pack and the body of a mobile communication terminal. In the following description given in conjunction with FIGS. 9 to 11, no description of unnecessarily repeated configurations will be given.

As shown in FIG. 9, the communication connector, which is applied to a mobile communication terminal provided with a smart card slot, includes a first connector section including a housing 915 having an outer structure of a certain shape, and terminal members 921 provided at the housing 915. Each of the terminal members 921 is electrically connected, at one end 917 thereof, with an associated one of terminals (not shown) provided at the lower surface of a smart card (not shown), while being electrically connected, at the other end 919 thereof, with an associated one of communication terminals 923 provided at a PCB 925 of the mobile communication terminal. The communication connector also includes a second connector section including a guide member adapted to guide and detachably mount the smart card while having holders 911 adapted to cover at least a part of the upper surface of the smart card, thereby holding the smart card, an upper connecting member 905 having a plurality of terminals respectively provided at the upper surfaces of the holders 911, and electrically connected with terminals 903 extending from a circuit (not shown) internally provided at a battery pack 901 to a lower surface of the battery pack 901, a lower connecting member 909 having a plurality of terminals each electrically connected with one of one end 917 or the other end 919 of an associated one of the terminals 921 included in the first connector section or an associated one of the communication terminals 923 provided at the PCB 925, and an intermediate connecting member 907 adapted to electrically connect associated terminals of the upper and lower connecting members 905 and 909.

The first connector section corresponds to a well-known smart card connector (socket) used for electrical connection between the terminals (not shown) provided at the lower surface of the smart card (not shown) and the communication terminals 923 provided at the PCB 925 of the mobile communication terminal body. Accordingly, no detailed description of the first connector section will be given.

The guide member, which is adapted to guide and detachably mount the smart card, is well known in technical fields associated with mobile communication terminal housings and smart card connectors. Accordingly, no further description of the guide member will be given.

The terminals of the upper connecting member 905, which are provided at respective upper surfaces of the holders 911, are electrically connected with respective terminals 903 arranged at the lower surface of the battery pack 901 while extending from the battery pack circuit (not shown). The upper connecting member 905 is adapted to electrically connect the communication terminals 923 of the PCB 925, hidden by the smart card, to a mounting surface on which the battery pack is to be mounted. The upper surfaces of the holders 911 provide the mounting surface on which the battery pack is to be mounted. Accordingly, the terminals 903 of the battery pack circuit are electrically connected with the communication terminals 923 of the PCB 925 by the upper and lower connecting members 905 and 909 and intermediate connecting member 907 provided at the second connector section, respectively.

In the embodiment of FIG. 9, the terminals of the lower connecting member 909 are illustrated as being electrically connected to respective upper ends of the terminal members 921 included in the first connector section, that is, respective ends 917. However, the terminals of the lower connecting member 909 may be electrically connected to respective lower ends of the terminal members 921, that is, respective ends 919, or respective communication terminals 923 of the PCB 925.

In accordance with the embodiment illustrated in FIG. 10, the guide member, which is adapted to guide and detachably mount the smart card, is integral with the first connector section.

In either the embodiment illustrated in FIG. 9 or the embodiment illustrated in FIG. 10, the intermediate connecting member 907 or 1007 comprises elastic members each having a bent structure. Electrical connection between two terminals using an elastic member having a bent structure is well known in the mobile communication terminal manufacturing field. Accordingly, it will be appreciated by those skilled in the art that the electrical connection between the upper connecting member 905 or 1005 and the lower connecting member 909 or 1009 can be achieved using the intermediate connecting member 907 or 1007. Thus, it is possible to very simply implement a communication connector structure without any modification of the existing smart card mounting structure.

The embodiment of FIG. 11 is characterized in that the intermediate connecting member comprises patterns printed on a desired surface provided at the mobile communication terminal.

Since the upper and lower connecting members designated by the reference numerals 1105 and 1109 in FIG. 11 are electrically connected by the printed patterns formed in accordance with a pattern printing method for electrical connection between two terminals known in the mobile communication terminal manufacturing field, it is possible to very simply implement a communication connector structure without any modification of the existing smart card mounting structure.

Figure 13:
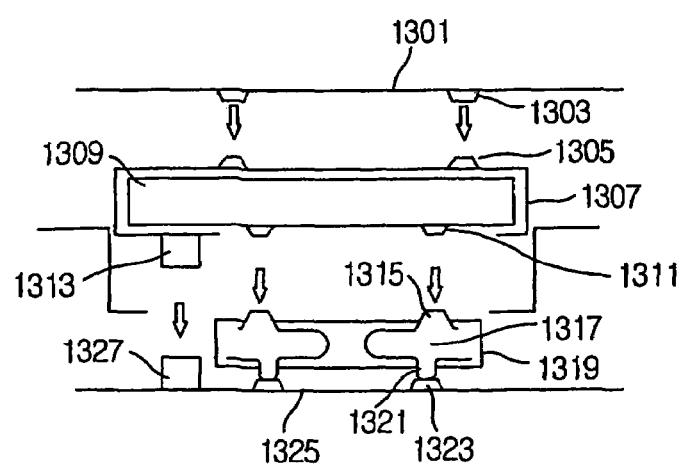
FIGS. 13 to 15 are sectional views respectively illustrating additional examples of the communication connector for connecting the battery pack circuit and the terminal body in accordance with the present invention.

FIG. 13 is a sectional view illustrating another example of a communication connector for connecting a circuit internally provided at a battery pack and the body of a mobile communication terminal. In the following description given in conjunction with FIG. 13, no description of unnecessarily repeated configurations will be given.

As shown in FIG. 13, the communication connector, which is applied to a mobile communication terminal provided with a smart card slot, includes a first connector section including a housing 1319 having an outer structure of a certain shape, and terminal members 1317 provided at the housing 1319. Each of the terminal members 1317 is electrically connected, at one end 1315 thereof, with an associated one of terminals 1311 provided at the lower surface of a smart card 1309, while being electrically connected, at the other end 1321 thereof, with an associated one of smart card communication terminals 1323 provided at a PCB 1325 of the mobile communication terminal. The communication connector also includes a second connector section including a clip member 1307 for receiving the smart card 1309 such that it is in close contact with at least a part of the upper/lower surface of the smart card 1309 while covering the upper/lower surface part, an upper connecting member 1305 provided at the upper surface of the clip member 1307 while having a plurality of terminals each electrically connected with an associated one of terminals 1303 extending from a circuit (not shown) internally provided at a battery pack 1310 to a lower surface of the battery pack 1310, a lower connecting member 1313 provided at the lower surface of the clip member 1307 while having a plurality of terminals each electrically connected with an associated one of battery pack circuit communication terminals 1327 provided at the PCB 1325, and an intermediate connecting member (not shown) adapted to electrically connect associated terminals of the upper and lower connecting members 1305 and 1313.

The first connector section corresponds to a well-known smart card connector (socket) used for electrical connection between the terminals 1315 provided at the lower surface of the smart card 1309 and the communication terminals 1323 provided at the PCB 1325 of the mobile communication terminal body. Accordingly, no detailed description of the first connector section will be given.

In accordance with the present invention, the smart card 1309 is inserted in the clip member 1307. For example, the smart card 1309 is forcibly fitted in the clip member 1307. The clip member 1307 is adapted to electrically connect the communication terminals 1323 of the PCB 1325, hidden by the smart card 1309, to a mounting surface on which the battery pack 1310 is to be mounted. The upper surface of the clip member 1307 provides the mounting surface on which the battery pack 1310 is to be mounted. The terminals 1303 of the battery pack circuit are electrically connected to the terminals 1327 of the PCB 1325 by the upper and lower connecting members 1305 and 1313 provided at the clip member 1307, and the intermediate connecting member, respectively. Accordingly, the clip member 1307 electrically connects the battery pack circuit communication terminals 1323 of the PCB 1325 to the terminals 1303 of the battery pack circuit.

In this case, the housing of the mobile communication terminal body may be designed in such a manner that the space defined therein to receive the smart card is increased by the thickness of the clip member 1307, and the hole thereof formed to externally expose the first connector section has a width increased to provide a space for electrical connection between the terminals 1313 of the clip member 1305 and the terminals 1327 of the PCB 1325. Where the housing of the mobile communication terminal body has an elasticity, it is usable as it is, without any modification of the space thereof for receiving the smart card.

In association with the PCB, there is only a requirement for the PCB to be additionally provided with the terminals 1323 for communication with the battery pack circuit. In order to minimize an increase in the size of the PCB while achieving a firm electrical connection, male and female board-to-board connectors may be used which are conventionally used in designing a mobile communication terminal circuit.

Figure 16:
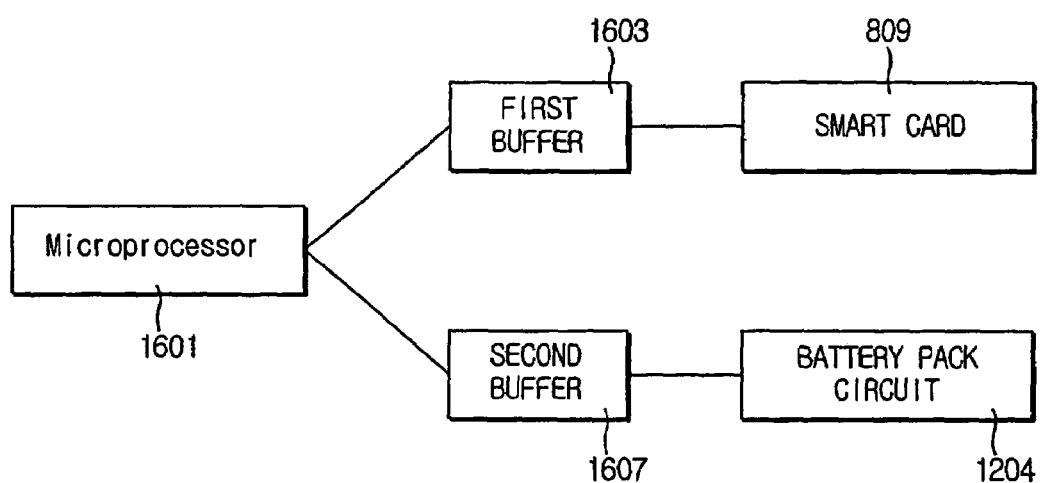
FIG. 16 is a block diagram illustrating the connection of the microprocessor included in the terminal body with the battery pack circuit and the smart card in accordance with another embodiment of the present invention.

In accordance with another aspect of the present invention, as shown in FIG. 16, the PCB of the mobile communication terminal includes a first buffer 1603 for buffering data transmitted between a microprocessor 1601 provided at the PCB and the smart card 809, and a second buffer 1607 for buffering data transmitted between the microprocessor 1601 and the battery pack circuit 1204.

Since the mobile communication terminal communicates with both the smart card and the battery pack circuit, it is preferable to buffer data transmitted during the communication, using the first and second buffers 1603 and 1607. In this case, the microprocessor of the mobile communication terminal can smoothly communicate with both the smart card and the battery pack circuit. In order to achieve smooth data transmission between a master device and two slave devices, techniques for implementing separate buffering functions for respective slave devices have been used. Accordingly, no further description of the buffers will be given.

Figure 14:
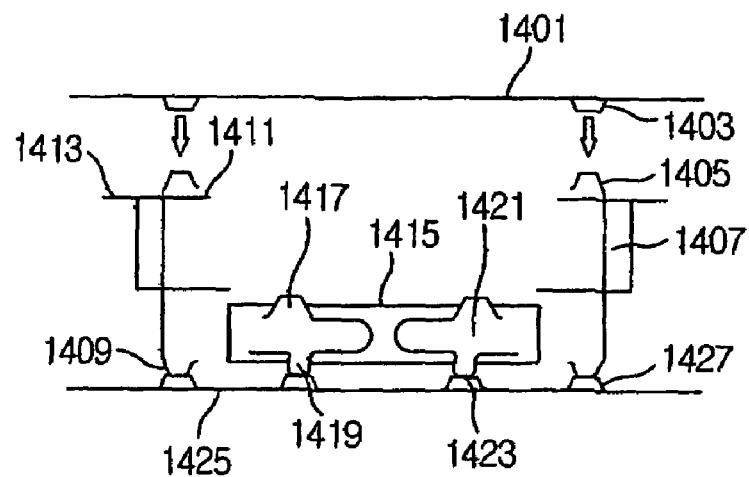
Figure 15:
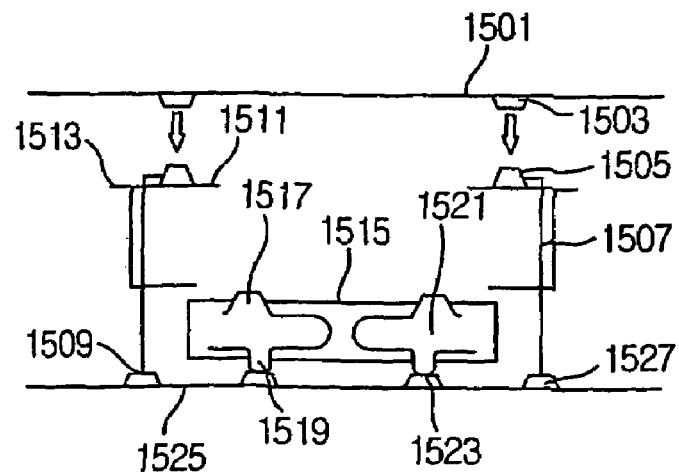

FIGS. 14 and 15 are sectional views each illustrating another example of a communication connector for connecting a circuit internally provided at a battery pack and the body of a mobile communication terminal. In the following description given in conjunction with FIGS. 14 and 15, no description of unnecessarily repeated configurations will be given.

As shown in FIG. 14, the communication connector, which is applied to a mobile communication terminal provided with a smart card slot, includes a first connector section including a housing 1415 having an outer structure of a certain shape, and terminal members 1421 provided at the housing 1415. Each of the terminal members 1421 is electrically connected, at one end 1417 thereof, with an associated one of terminals (not shown) provided at the lower surface of a smart card (not shown), while being electrically connected, at the other end 1419 thereof, with an associated one of communication terminals 1419 provided at a PCB 1425 of the mobile communication terminal. The communication connector also includes a second connector section including a guide member adapted to guide and detachably mount the smart card while having holders 1411 adapted to cover at least a part of the upper surface of the smart card, thereby holding the smart card, an upper connecting member 1405 having a plurality of terminals respectively provided at the upper surfaces of the holders 1411, and electrically connected with terminals 1403 extending from a circuit (not shown) internally provided at a battery pack 1401 to a lower surface of the battery pack 1401, a lower connecting member 1409 having a plurality of terminals each electrically connected with an associated one of battery pack circuit communication terminals 1427 provided at the PCB 1425, and an intermediate connecting member 1407 adapted to electrically connect associated terminals of the upper and lower connecting members 1405 and 1409.

The first connector section corresponds to a well-known smart card connector (socket) used for electrical connection between the terminals (not shown) provided at the lower surface of the smart card (not shown) and the communication terminals 1423 provided at the PCB 1425 of the mobile communication terminal body. Accordingly, no detailed description of the first connector section will be given.

The guide member, which is adapted to guide and detachably mount the smart card, is well known in technical fields associated with mobile communication terminal housings and smart card connectors. Accordingly, no further description of the guide member will be given.

The terminals of the upper connecting member 1405, which are provided at respective upper surfaces of the holders 1411, are electrically connected with respective terminals 1403 extending from the battery pack circuit (not shown) to the lower surface of the battery pack 1401. The upper connecting member 1405 is adapted to electrically connect the communication terminals 1427 of the PCB 1425, hidden by the smart card, to a mounting surface on which the battery pack is to be mounted. The upper surfaces of the holders 1411 provide the mounting surface on which the battery pack is to be mounted. Accordingly, the terminals 1403 of the battery pack circuit are electrically connected with the communication terminals 1427 of the PCB 1425 by the upper and lower connecting members 1405 and 1409 and intermediate connecting member 1407 provided at the second connector section, respectively.

In the embodiment of FIG. 14, the intermediate connecting member 1407 comprises elastic members each having a bent structure. Electrical connection between two terminals using an elastic member having a bent structure is well known in the mobile communication terminal manufacturing field. Accordingly, it will be appreciated by those skilled in the art that the electrical connection between the upper connecting member 1405 and the lower connecting member 1409 can be achieved using the intermediate connecting member 1407. Thus, it is possible to very simply implement a communication connector structure without any modification of the existing smart card mounting structure.

In the embodiment of FIG. 15, the intermediate connecting member comprises patterns printed on a desired surface provided at the mobile communication terminal. Since the upper and lower connecting members designated by the reference numerals 1505 and 1509 in FIG. 15 are electrically connected by the printed patterns formed in accordance with a pattern printing method for electrical connection between two terminals known in the mobile communication terminal manufacturing field, it is possible to very simply implement a communication connector structure without any modification of the existing smart card mounting structure.

FIG. 17 is a plan view illustrating the structure of the communication connector according to the present invention.

In FIG. 17, the reference numeral 1715 designates the housing of the first connector section, 1717 the terminals provided at the first connector section, 1705 the upper connecting member of the second connector section having a plurality of terminals respectively provided at the upper surfaces of the holders for holding the smart card, and 1707 patterns each adapted to electrically connect each terminal of the upper connecting member 1705 to an associated one of the lower connecting member (not shown).

INDUSTRIAL APPLICABILITY

As apparent from the above description, the present invention provides superior effects in that it is possible to support additional functions of a battery pack while minimizing modification of a mold used to manufacture the body of a mobile communication terminal, to which the battery pack is to be coupled, and addition of hardware or without any modification of the mold and any addition of hardware.

As described above, the power consumption of circuits included in the battery pack is controlled in accordance with the power management mode of the terminal body in accordance with the present invention. Accordingly, it is possible to greatly efficiently reduce the problem of a reduction in continuous battery use time caused by the additional functions provided at the battery pack.

Furthermore, the present invention provides a very simple power management configuration for the battery pack circuit in which the power consumption of the battery pack circuit is controlled in accordance with the power consumption of the terminal body by indirectly measuring the electric power supplied to the terminal body or controlling the power consumption of the battery pack circuit in accordance with data about the operating mode of the terminal body received from an application program loaded in the terminal body.

As described above, in accordance with the present invention, it is also possible to electrically connect the terminals of the battery pack circuit to associated terminals of the PCB included in the mobile communication terminal by use of upper and lower connecting members included in a clip member, without any modification of the existing smart card mounting structure adapted to mount a smart card while electrically connecting terminals provided at a lower surface of the smart card to associated communication terminals of a microprocessor included in the mobile communication terminal, by inserting the smart card in the clip member, for example, forcibly fitting the smart card in the clip member.

In response to an enable signal from the microprocessor included in the mobile communication terminal body, only an associated one of the smart card and battery pack circuit operates. Accordingly, although the terminals provided at the smart card and the terminals of the battery pack circuit are electrically connected to the same terminals of the mobile communication terminal body, it is possible to prevent collision of data, being transmitted, in a software manner.

As described above, in accordance with the present invention, it may also be possible to electrically connect the terminals of the battery pack circuit to associated terminals of the PCB included in the mobile communication terminal by electrically connecting the terminals of the battery pack circuit to respective upper surfaces of holders included, to cover at least a part of the upper surface of a smart card, in the existing smart card mounting structure adapted to mount the smart card while electrically connecting terminals provided at the lower surface of the smart card to associated communication terminals of the microprocessor included in the mobile communication terminal, while using the existing connection configuration for the terminals of the PCB.

In accordance with the present invention, it may also be possible to electrically connect the terminals of the battery pack circuit to respective terminals separately provided at the PCB included in the mobile communication terminal by use of the upper and lower connecting members included in the clip member, without any modification of the existing smart card mounting structure adapted to mount the smart card while electrically connecting terminals provided at the lower surface of the smart card to the associated communication terminals of the microprocessor included in the mobile communication terminal, by inserting the smart card in the clip member, for example, forcibly fitting the smart card in the clip member. In this case, the housing of the mobile communication terminal body may be designed in such a manner that the space defined therein to receive the smart card is increased by the thickness of the clip member. Where the housing of the mobile communication terminal body has an elasticity, it is usable as it is, without any modification of the space thereof for receiving the smart card. Also, it is only required that the hole formed at the housing to externally expose a required connector section, for example, the first connector section in the conventional connector, has a width increased to provide a space for electrical connection between the lower connecting members of the clip member and the terminals of the PCB.

In association with the PCB, there is only a requirement for the PCB to be additionally provided with terminals for communication with the battery pack circuit. In order to minimize an increase in the size of the PCB while achieving a firm electrical connection, male and female board-to-board connectors may be used which are conventionally used in designing a mobile communication terminal circuit.

As described above, in accordance with the present invention, it may also be possible to electrically connect the terminals of the battery pack circuit to respective terminals separately provided at the PCB included in the mobile communication terminal by use of the upper and lower connecting members included in the clip member by electrically connecting the terminals of the battery pack circuit to respective upper surfaces of holders included, to cover at least a part of the upper surface of a smart card, in the existing smart card mounting structure adapted to mount the smart card while electrically connecting terminals provided at the lower surface of the smart card to associated communication terminals of the microprocessor included in the mobile communication terminal, while using upper and lower connecting members (according to the present invention. For the upper and lower connecting members, elastic members having a bent structure or patterns may be used. Accordingly, it is possible to very simply implement the above described electrical connection.

In association with the PCB, there is only a requirement for the PCB to be additionally provided with terminals for communication with the battery pack circuit.

Since the mobile communication terminal communicates with both the smart card and the battery pack circuit, buffers may be used to buffer data transmitted during the communication in accordance with the present invention. In this case, the microprocessor of the mobile communication terminal can smoothly communicate with both the smart card and the battery pack circuit.

The invention claimed is:

1. In a mobile communication terminal including a smart card slot, a communication connector for connecting a circuit internally provided at a battery pack to a body of the mobile communication terminal, the communication connector comprising:
   a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; and
   a second connector section including a clip member for receiving the smart card such that it is in close contact with at least a part of the lower surface of the smart card and at least a part of an upper surface of the smart card while covering the upper and lower surface parts, an upper connecting member provided at an upper surface of the clip member while having a plurality of terminals each electrically connected with an associated one of terminals extending from the circuit internally provided at the battery pack to a lower surface of the battery pack, a lower connecting member provided at a lower surface of the clip member while having a plurality of terminals each electrically connected with an associated one of terminals provided at the lower surface of the smart card, and an intermediate connecting member adapted to electrically connect associated terminals of the upper and lower connecting members.

2. The communication connector according to claim 1, wherein the PCB of the mobile communication terminal outputs includes a microprocessor for outputting a first enable signal to the smart card while outputting a second enable signal to the battery pack circuit.

3. The communication connector according to claim 1 or 2, wherein the intermediate connecting member comprises patterns printed on a surface of the clip member.

4. In a mobile communication terminal including a smart card slot, a communication connector for connecting a circuit internally provided at a battery pack to a body of the mobile communication terminal, the communication connector comprising:
   a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal;

a guide member adapted to guide and detachably mount the smart card while having holders adapted to cover at least a part of an upper surface of the smart card, thereby holding the smart card; and a second connector section including an upper connecting member having a plurality of terminals provided at respective upper surfaces of the holders, and electrically connected with terminals extending from a circuit internally provided at the battery pack to a lower surface of the battery pack, a lower connecting member having a plurality of terminals each electrically connected with one of one end or the other end of an associated one of the terminals included in the first connector section or an associated one of the terminals provided at the PCB, and an intermediate connecting member adapted to electrically connect associated terminals of the upper and lower connecting members.

5. The communication connector according to claim 4, wherein the PCB of the mobile communication terminal outputs includes a microprocessor for outputting a first enable signal to the smart card while outputting a second enable signal to the battery pack circuit.

6. The communication connector according to claim 4 or 5, wherein the intermediate connecting member comprises patterns printed on a surface of the terminal body.

7. The communication connector according to claim 4 or 5, wherein the intermediate connecting member comprises elastic members each having a bent structure.

8. In a mobile communication terminal including a smart card slot, a communication connector for connecting a circuit internally provided at a battery pack to a body of the mobile communication terminal, the communication connector comprising:

a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; and a second connector section including a clip member for receiving the smart card such that it is in close contact with at least a part of the lower surface of the smart card and at least a part of an upper surface of the smart card while covering the upper and lower surface part, an upper connecting member provided at an upper surface of the clip member while having a plurality of terminals each electrically connected with an associated one of terminals extending from a circuit (not shown) internally provided at the battery pack to a lower surface of the battery pack, a lower connecting member provided at a lower surface of the clip member while having a plurality of terminals each electrically connected with an associated one of battery pack circuit communication terminals provided at the PCB, and an intermediate connecting member adapted to electrically connect associated terminals of the upper and lower connecting members.

9. The communication connector according to claim 8, wherein the terminals of the lower connecting member included in the second connector section are connected with the battery pack circuit communication terminals of the PCB in a male/female board-to-board connection fashion.

10. The communication connector according to claim 8, wherein the PCB of the mobile communication terminal includes: a first buffer for buffering data transmitted between a microprocessor provided at the PCB and the smart card; and a second buffer for buffering data transmitted between the microprocessor and the battery pack circuit.

11. The communication connector according to claim 8, wherein the intermediate connecting member comprises patterns printed on a surface of the clip member.

12. In a mobile communication terminal including a smart card slot, a communication connector for connecting a circuit internally provided at a battery pack to a body of the mobile communication terminal, the communication connector comprising:

a first connector section including a housing having an outer structure of a desired shape, and terminal members provided at the housing, each of the terminal members being electrically connected, at one end thereof, with an associated one of terminals provided at a lower surface of a smart card, while being electrically connected, at the other end thereof, with an associated one of terminals provided at a printed circuit board (PCB) included in the mobile communication terminal; a guide member adapted to guide and detachably mount the smart card while having holders adapted to cover at least a part of an upper surface of the smart card, thereby holding the smart card; and a second connector section including an upper connecting member having a plurality of terminals provided at respective upper surfaces of the holders, and electrically connected with terminals extending from a circuit internally provided at the battery pack to a lower surface of the battery pack, a lower connecting member having a plurality of terminals each electrically connected with an associated one of battery pack circuit communication terminals provided at the PCB, and an intermediate connecting member adapted to electrically connect associated terminals of the upper and lower connecting members.

13. The communication connector according to claim 12, wherein the PCB of the mobile communication terminal includes:

a first buffer for buffering data transmitted between a microprocessor provided at the PCB and the smart card; and a second buffer for buffering data transmitted between the microprocessor and the battery pack circuit.

14. The communication connector according to claim 12 or 13, wherein the intermediate connecting member comprises patterns printed on a surface of the terminal body.

15. The communication connector according to claim 12 or 13, wherein the intermediate connecting member comprises elastic members each having a bent structure.

* * * * *